United States Patent
Kwak

(10) Patent No.: US 7,673,124 B2
(45) Date of Patent: Mar. 2, 2010

(54) FILTERED BRANCH-PREDICTION PREDICATE GENERATION

(75) Inventor: Jong Wook Kwak, Suwon (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 215 days.

(21) Appl. No.: 11/709,060

(22) Filed: Feb. 22, 2007

(65) Prior Publication Data

US 2008/0052501 A1    Feb. 28, 2008

(30) Foreign Application Priority Data

Aug. 25, 2006  (KR) .................. 10-2006-0081168

(51) Int. Cl.
*G06F 9/00* (2006.01)
(52) U.S. Cl. ................. 712/240; 712/239
(58) Field of Classification Search .......... 712/240
See application file for complete search history.

(56) References Cited

U.S. PATENT DOCUMENTS

| | | | | |
|---|---|---|---|---|
| 5,890,008 | A * | 3/1999 | Panwar et al. ................. 712/15 |
| 6,151,672 | A * | 11/2000 | Hunt ........................... 712/239 |
| 6,212,623 | B1 * | 4/2001 | Witt ............................ 712/216 |
| 6,249,862 | B1 * | 6/2001 | Chinnakonda et al. ...... 712/218 |
| 6,427,206 | B1 * | 7/2002 | Yeh et al. ..................... 712/239 |
| 6,560,693 | B1 * | 5/2003 | Puzak et al. ................. 712/207 |
| 6,877,089 | B2 * | 4/2005 | Sinharoy ...................... 712/239 |
| 2004/0225872 | A1 * | 11/2004 | Bonanno et al. ............ 712/239 |
| 2005/0149707 | A1 | 7/2005 | Jourdan et al. |
| 2005/0216714 | A1 * | 9/2005 | Grochowski ................ 712/240 |

FOREIGN PATENT DOCUMENTS

| | | |
|---|---|---|
| JP | 2004-038323 | 2/2004 |
| KR | 10-2001-037992 | 5/2001 |

OTHER PUBLICATIONS

Ramirez, "Branch Prediction Techniques" CEPBA, http://research.ac.upc.edu/HPCseminar/SEM9900/alex.ppt, Oct. 18, 2006.

(Continued)

*Primary Examiner*—Eric Coleman
(74) *Attorney, Agent, or Firm*—Harness, Dickey & Pierce, P.L.C.

(57) ABSTRACT

A method, of manipulating a raw branch history (RBH), can include: providing a RBH relevant to a conditional branching instruction in a program; and filtering the RBH to obtain a filtered branch-prediction predicate. A related method, of making a branch prediction, can include: manipulating, as in the above-mentioned method, a RBH relevant to a given conditional branching instruction (CBI) to obtain a corresponding filtered branch-prediction predicate; and predicting a branching direction of the given CBI based upon the corresponding filtered branch-prediction predicate. Such methods operate upon data provided by a memory representing a Branch Register-Dependency Table (Br_RDT) that includes: entries corresponding to registers in a CPU, respectively; each entry in the Br_RDT being indicative of how content of a corresponding register in the CPU is dependent or not upon other ones among the plurality of registers in the CPU.

27 Claims, 15 Drawing Sheets

OTHER PUBLICATIONS

Juan et al., "Dynamic History-Length Fitting: A third level of adapivity for branch prediction" Proceedings of the 25$^{th}$ Annual Inter. Sym. on Comp. Arch., http://portal.acm.org/citation.cfm?doid=279358.279379, (1998).

Co, "Intro to Branch Prediction" Univ. of Virginia, http://www.cs.virginia.edu/~skadron/cs654/slides/bpred.ppt, Sep. 11, 2001.

Yew, "Branch Prediction Schemes in High-Performance Superscalars" Univ. of Minnesota, http://www.iicm.org.tw/ann/attach/117_4Branch-Prediction.ppt.

Studer, "Branch Prediction" http://www.ece.rochester.edu/~mihuang/TEACHING/OLD/ECE404_SPRING03/Branch%20Prediction.ppt.

\* cited by examiner

| Br_RDT | | | | | | | |
|---|---|---|---|---|---|---|---|
| X | X | X | X | X | X | X | X |
| X | X | X | X | X | X | X | X |
| X | X | X | X | X | X | X | X |
| X | X | X | X | X | X | X | X |

| Br_RDT | | | | | | | |
|---|---|---|---|---|---|---|---|
| X | X | X | X | X | X | X | 0 |
| X | X | X | X | X | X | X | 1 |
| X | X | X | X | X | X | X | 0 |
| X | X | X | X | X | X | X | 0 |

| Br_RDT | | | | | | | |
|---|---|---|---|---|---|---|---|
| X | X | X | X | X | X | X | 1 |
| X | X | X | X | X | X | X | 1 |
| X | X | X | X | X | X | X | 0 |
| X | X | X | X | X | X | X | 0 |

| Br_RDT | | | | | | | |
|---|---|---|---|---|---|---|---|
| X | X | X | X | X | X | 0 | 0 |
| X | X | X | X | X | X | 1 | 0 |
| X | X | X | X | X | X | X | 1 |
| X | X | X | X | X | X | 0 | 0 |

| Br_RDT | | | | | | | |
|---|---|---|---|---|---|---|---|
| 0 | 0 | 0 | 0 | X | X | 0 | 0 |
| X | X | X | X | 1 | X | 1 | 0 |
| X | X | X | X | X | 1 | X | 1 |
| X | X | X | X | X | 0 | 0 | 0 |

| Br_RDT | | | | | | | |
|---|---|---|---|---|---|---|---|
| 0 | 0 | X | X | X | 0 | 0 | 0 |
| X | X | X | X | 1 | X | 0 | 0 |
| X | X | X | X | X | 1 | 0 | 0 |
| X | X | X | X | X | X | X | 1 |

R1, R2, R3, R4

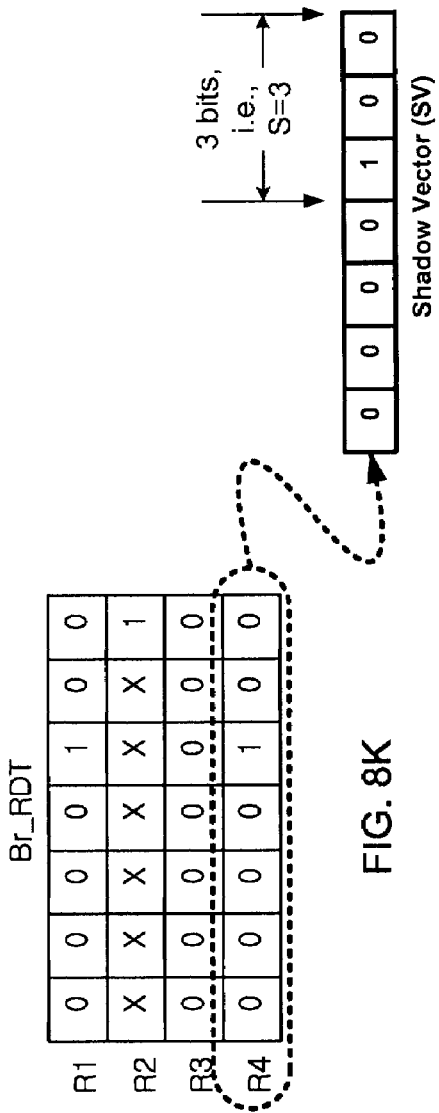

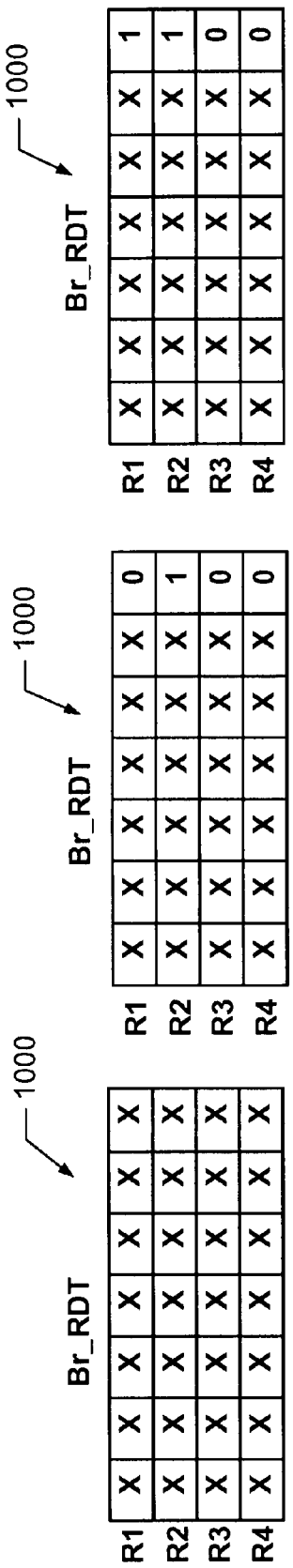
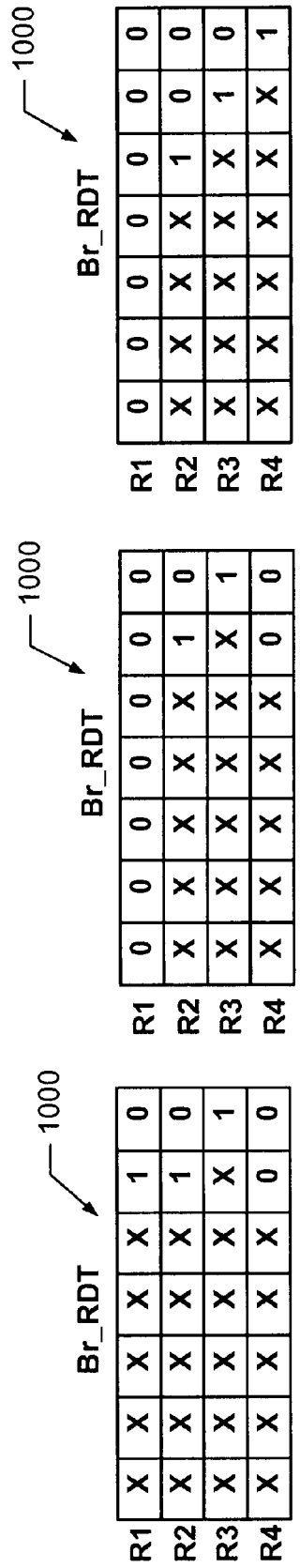
FIG. 10A
FIG. 10B
FIG. 10C
FIG. 10D
FIG. 10E
FIG. 10F

FILTERED BRANCH-PREDICTION PREDICATE GENERATION

PRIORITY STATEMENT

This application claims the priority under 35 U.S.C. §119 upon Korean Patent Application No. P2006-0081168, filed on Aug. 25, 2006, the disclosure of which is incorporated herein in its entirety by reference.

BACKGROUND

A branch prediction is a prediction of what direction will be taken upon execution of a conditional branching instruction included within a sequence of code being executed by a machine. Branch prediction mechanism are generally known, and is used to improve the rate at which the code sequence can be executed.

In general, a Branch History Table (BHT) or Global History Register (GHR) is included with a Central Processing Unit (CPU) in a processor. The BHT is used for making branch predictions. Typically, the BHT is arranged so that the number N of rows (or depth) corresponds to the number of working registers in CPU 400, e.g., 32, 64, etc. Each row represents an R-bit word, where the value of R (or length of the BHT) corresponds to the number of columns in the BHT, where R is a positive integer. Typically, the GHR is a one-row array, also of length R, i.e., the GHR represents an R-bit word. The output of either the BHT or the GHR is an R-bit vector representing a local or global branching history, respectively.

In operation, when a prediction is to be made regarding the next conditional branching instruction, an R-bit branch history vector (HV) is output from either the BHT or the GHR. The prediction is based upon the R-bit history vector HV. Hence, the R-bit history vector HV can be described as a predicate to the branch prediction, i.e., as a branch-prediction predicate. All of the R-bits in the HV are used in making the prediction.

Generally, the value of R (again, representing the length of each entry in the BHT or the length of the GHR) is fixed as a part of the architecture of the processor. Some architectures, however, are arranged so that the value of R can be adaptively adjusted. Despite the adaptive adjustment, i.e., despite whatever size R takes, all of the R-bits in the HV are used in making the prediction.

SUMMARY

An embodiment of the present invention provides a method of manipulating a raw branch history. Such a method can include: providing a raw branch history relevant to a conditional branching instruction in a program; and filtering the raw branch history to obtain a filtered branch-prediction predicate. Another embodiment of the present invention provides a method of making a branch prediction. Such a method can include manipulating, as in the above-mentioned method, a raw branch history relevant to a given conditional branching instruction (CBI) to obtain a corresponding filtered branch-prediction predicate; and predicting a branching direction of the given CBI based upon the corresponding filtered branch-prediction predicate.

An embodiment of the present invention provides a memory representing a Branch Register-Dependency Table (Br_RDT), the memory being arranged for storing information relevant to a program executable by a Central Processing Unit (CPU). Such a memory can include: a plurality of entries corresponding to the plurality of registers in the CPU, respectively; each entry in the Br_RDT being indicative of how content of a corresponding register in the CPU is dependent or not upon other ones among the plurality of registers in the CPU.

An embodiment of the present invention provides a method to populate a memory representing a Branch Register-Dependency Table (Br_RDT), the Br_RDT being adapted for storing information relevant to a multi-instruction program executable by a Central Processing Unit (CPU), the Br_RDT including entries corresponding to registers in the CPU, respectively. Such a method can include: fetching an instruction from the program; and updating the Br_RDT according to a first or second process depending upon whether the instruction is a conditional branching instruction (CBI) or a Register-Writing instructions (RWI), respectively. Such a first process can include: altering, where the jth register is a subject register of a condition recited in the CBI, the Br_RDT (j) entry by performing thereon a first logical operation using as operands the Br_RDT(j) entry and any other entries in the Br_RDT corresponding to source registers upon which the jth register is dependent; bitwise left-shifting the entries in the Br_RDT, respectively; and inserting a value of logical zero into least significant bits (LSBs) of the entries in the Br_RDT, respectively. Such a second process can include: altering, where the jth register is a destination register recited by the RWI, the Br_RDT(j) entry by performing thereon a first logical operation using as operands the Br_RDT(j) entry and any other entries in the Br_RDT corresponding to source registers recited by the RWI if at least one source register is recited by the RWI; and setting the Br_RDT(j) entry equal to a binary value of zero.

An embodiment of the present invention provides an apparatus for populating a memory representing a Branch Register-Dependency Table (Br_RDT), the Br_RDT being adapted for storing information relevant to a multi-instruction program executable by a Central Processing Unit (CPU), the Br_RDT including entries corresponding to registers in the CPU, respectively. Such an apparatus can include: fetching means for fetching an instruction from the program; and first processing means or second processing means. Such first processing means being for updating the Br_RDT if the instruction is a conditional branching instruction (CBI); and including: first altering means for altering, where the jth register is a subject register of a condition recited in the CBI, the Br_RDT(j) entry by performing thereon a first logical operation using as operands the Br_RDT(j) entry and any other entries in the Br_RDT corresponding to source registers upon which the jth register is dependent; and shifting means for bitwise left-shifting the entries in the Br_RDT and then inserting a value of logical zero into least significant bits (LSBs) of the entries in the Br_RDT, respectively. Such second processing means being for updating the Br_RDT if the instruction is a Register-Writing instructions (RWI), and including: second altering means for altering, where the jth register is a destination register recited by the RWI, the Br_RDT(j) entry by performing thereon a first logical operation using as operands the Br_RDT(j) entry and any other entries in the Br_RDT corresponding to source registers recited by the RWI if at least one source register is recited by the RWI, and setting means for setting the Br_RDT(j) entry equal to a binary value of zero.

An embodiment of the present invention provides a filter operable upon a raw branch history available from a branch history memory. Such a filter can include: a mask generator to generate a bit mask based upon a raw branch history; and a masking unit to apply the bit mask to the raw branch history resulting in a filtered branch-prediction predicate. Another embodiment of the present invention provides an apparatus for making a branch prediction. Such an apparatus can include: a branch history memory in which a raw branch history is storable; a filter as mentioned above to filter a raw branch history, provided by the branch history memory and relevant to a given conditional branching instruction (CBI), resulting in a filtered branch-prediction predicate; and prediction logic operable to predict a branching direction of the given CBI based upon the corresponding filtered branch-prediction predicate.

An embodiment of the present invention provides a computer system. Such a computer system can include: a system bus; a memory coupled to the bus; a Central Processing Unit (CPU); and a prediction apparatus for making a branch prediction as in claim 23, the branch prediction apparatus facilitating execution by the CPU of instructions in a program.

An embodiment of the present invention provides a method of manipulating a raw branch history. Such a method can include: providing a raw branch history, the raw branch history representing a history of branching related to a plurality of conditional branching instructions (CBIs) in a program; and filtering the raw branch history based upon supplemental historical information, the supplemental historical information relating to the CBIs in the program and to at least one type of instruction in the program other than a CBI, resulting in a filtered branch-prediction predicate. Another embodiment of the present invention provides a method of making a branch prediction. Such a method can include: manipulating, as in the method (mentioned above) of manipulating a raw branch history, a raw branch history relevant to a given conditional branching instruction (CBI) to obtain a corresponding filtered branch-prediction predicate; and predicting a branching direction of the given CBI based upon the corresponding filtered branch-prediction predicate.

An embodiment of the present invention provides a method of making a branch prediction. Such a method can include: providing a first branch history reflecting (1) branching behavior of a plurality of conditional branching instructions (CBIs) in a program and (2) behavior of at least one type of instruction in the program other than a CBI; and predicting a branching direction of a given CBI based upon the first branch history.

BRIEF DESCRIPTION OF THE DRAWINGS

The accompanying drawings are intended to depict example embodiments of the present invention and should not be interpreted to limit the scope thereof. The accompanying drawings are not to be considered as drawn to scale unless explicitly noted.

In addition, FIG. 4 is a block diagram (according to an example embodiment of the present invention) of a computer system that includes a CPU.

FIGS. 6A-6K depict respective states of a Branch Register-Dependency Table (again, Br_RDT) resulting from CPU using Algorithm No. 1 to update Br_RDT as flow progresses under the specific (but not limiting) circumstances of the example of FIG. 2.

FIG. 7 depicts a shadow vector output from Br_RDT (again, Branch Register-Dependency Table) resulting from a CPU using Algorithm No. 1 to update Br_RDT as culminated in FIG. 6K under the specific (but not limiting) circumstances of the example of FIG. 2.

FIGS. 8A-8K depict respective states of a Branch Register-Dependency Table (again, Br_RDT) resulting from CPU using Algorithm No. 1 to update Br_RDT as flow progresses under the specific (but not limiting) circumstances of the example of FIG. 2.

FIG. 9 depicts a shadow vector output from Br_RDT (again, Branch Register-Dependency Table) resulting from a CPU using Algorithm No. 2 to update Br_RDT as culminated in FIG. 8K under the specific (but not limiting) circumstances of the example of FIG. 2.

FIGS. 10A-10K depict respective states of a Branch Register-Dependency Table (again, Br_RDT) resulting from a CPU using Algorithm No. 3 to update Br_RDT as flow progresses under the specific (but not limiting) circumstances of the example of FIG. 2.

FIG. 11 depicts a shadow vector output from Br_RDT (again, Branch Register-Dependency Table) resulting from CPU using Algorithm No. 3 to update Br_RDT as culminated in FIG. 10K under the specific (but not limiting) circumstances of the example of FIG. 2.

DETAILED DESCRIPTION OF EXAMPLE EMBODIMENTS

It will be understood that if an element or layer is referred to as being "on," "against," "connected to" or "coupled to" another element or layer, then it can be directly on, against connected or coupled to the other element or layer, or intervening elements or layers may be present. In contrast, if an element is referred to as being "directly on", "directly connected to" or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Figure 1A:
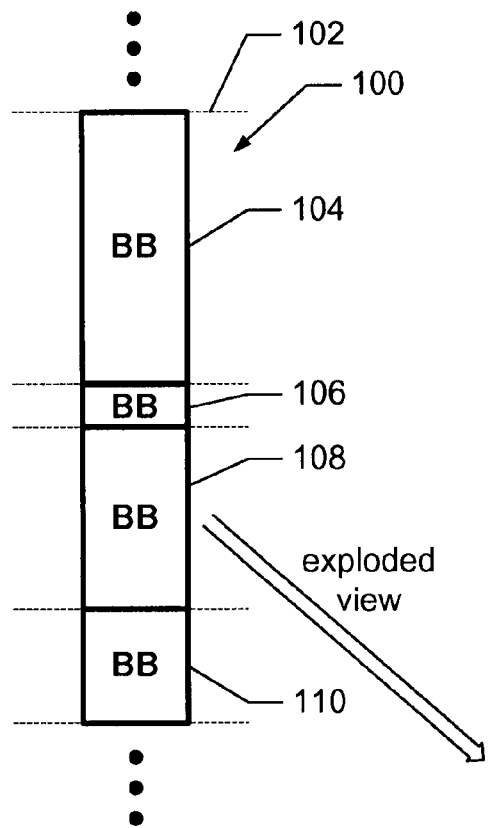
FIG. 1A depicts a symbolic representation (according to an example embodiment of the present invention) of sequence of code to be executed by a machine.

FIG. 1A depicts a symbolic representation (according to an example embodiment of the present invention) of sequence of code to be executed by a machine.

In FIG. 1A, it is assumed that code sequence 100 progresses from top to bottom, i.e., from the uppermost line of code to the lowermost line of code. Typically, each line of code represents an instruction to be executed by a machine, hence each line of code will be referred to as an instruction.

Code sequence 100 has been partitioned into Basic Blocks (BBs) 104-110 at partition boundaries 102. Software to achieve such block-partitioning is known. A given BB includes the lines of code found between two successive conditional branching instructions (Br_Instr), i.e., between a former conditional branching instruction Br_Instr(i−1) and a latter conditional branching instruction Br_Instr(i), as well as Br_Instr(i) itself. Here, it is to be understood that Br_Instr(i−1) is the conditional branching instruction that precedes Br_Instr(i). Within the given BB, there are no intervening conditional branching instructions between Br_Instr(i−1) and Br_Instr(i).

Each BB includes one or more instructions. The last, or bottommost, instruction in a BB is a conditional branching instruction. The BBs 104-110 typically include different amounts of instructions, hence BBs 104-110 are depicted as being different sizes in FIG. 1A. It should be understood, however, that two or more BBs may include the same amount of instructions, respectively.

Figure 1B:
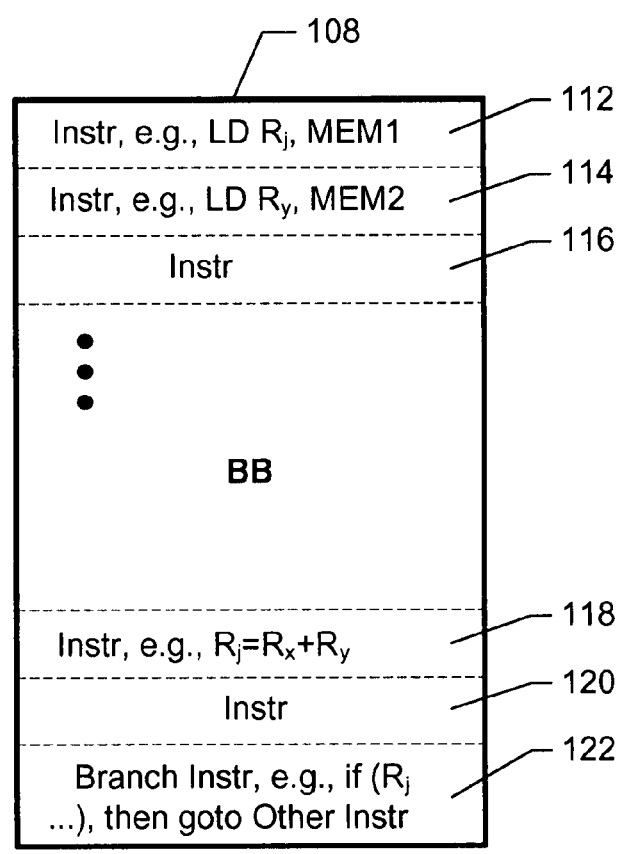
FIG. 1B is an exploded view of a BB (again, Basic Block) in FIG. 1A.

FIG. 1B is an exploded view of a BB (again, Basic Block) in FIG. 1A.

The BB 108 is depicted in FIG. 1B as including instructions 112-122. To establish context, it is assumed in FIG. 1B that the machine which will execute code sequence 100 includes at least four (4) registers, $R_h$, $R_i$, $R_j$ and $R_k$, where h, i, j and k are positive integer values. To further establish context, FIG. 1B provides non-limiting hypothetical examples for instructions 112, 114, 118 and 122.

In FIG. 1B, the first, or uppermost, instruction 112 is "LD $R_j$, MEM1," which is an example of a Register-Writing type of instruction that causes the value in memory location MEM1 to be loaded into register $R_j$, where $R_j$, can be described as a destination register. Instruction 114 is "LD $R_y$, MEM2," which is another example of a Register-Writing type of instruction that causes the value in memory location MEM2 to be loaded/written into register $R_y$. Instruction 118 is "$R_j=R_x+R_y$," which is another example of a Register-Writing instruction, here causing the value in register $R_j$ to be set equal to the sum of the values in registers $R_x$ and $R_y$, where $R_j$ is the destination register and $R_x$ & $R_y$ can be described as a source registers. The last, or bottommost, instruction 122 is a conditional branching instruction, "if ($R_h$ . . . ), then goto Other Instr," where $R_j$ can be described as the subject of the condition. If the condition ($R_h$ . . . ) recited in instruction 122 is not satisfied, then the branching direction leaving BB 108 will be toward the BB that is next in the code sequence (namely BB 110), i.e., the branch will not be taken (NT). If however, the condition is satisfied, then the branching direction leaving BB 108 will be toward a BB other than BB 110, i.e., the branch will be taken (T).

Figure 1C:
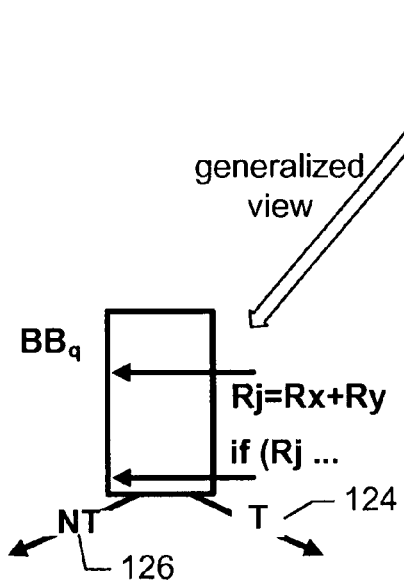
FIG. 1C is a generalized view of the BB (again, Basic Block) of FIG. 1B.

FIG. 1C is a generalized view of the BB (again, Basic Block) of FIG. 1B.

In FIG. 1C, two paths are depicted leading from the generalized depiction of BB 108. A first path 124 represents the branch taken, and paths such as this will be shown pointing downward and to the right. Here, path 124 is labeled as "T." A second path 124 represents having not taken the branch, and paths such as this will be shown pointing downward and to the left. Here, path 124 is labeled as "NT." As part of the generalization, only simplified representations 118' & 122' of instructions 118 & 122 are included, respectively. The generalized view of FIG. 1C is used to assemble a control flow diagram such as in FIG. 2 (discussed below).

Figure 2:
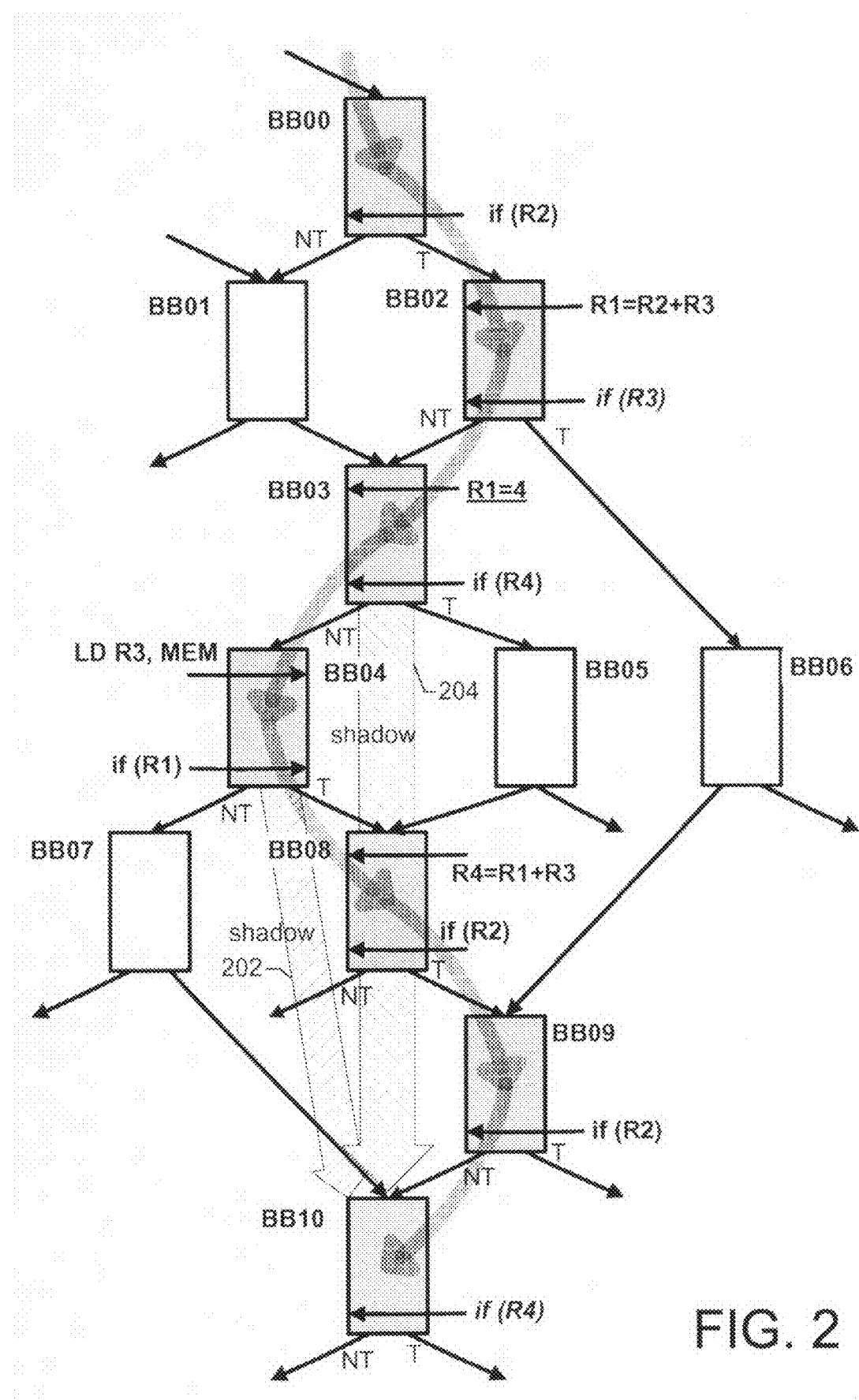
FIG. 2 is control flow diagram that symbolically represents (according to at least one example embodiment of the present invention) the flow of control arising from execution of a code sequence by a machine.

FIG. 2 is control flow diagram that symbolically represents (according to at least one example embodiment of the present invention) the flow of control arising from execution of a code sequence by a machine.

In FIG. 2, a portion of a non-limiting hypothetical source code is depicted, namely the portion corresponding to BBs (again, Basic Blocks) BB00-BB10. To establish a context that facilitates an understanding of how the flow of control is symbolically depicted, FIG. 2 assumes specific (but not limiting) branching relationships for BB01-BB10 and also provides specific (but not limiting) hypothetical examples for instructions in BB00, BB02-BB04 and BB08-BB10. Within this context, a prediction about the branching direction of BB10 using a filtered branch-prediction predicate generation technology (according to at least one embodiment of the present invention) can be discussed.

Starting at the end of the source code in FIG. 1, namely at BB10, flow proceeds in reverse through the portion of source code depicted in FIG. 2 as follows. The BB10 is reached by not having taken the branch in BB09. The BB09 is reached by having taken the branch in BB08. The BB08 is reached by having taken the branch in BB04. The BB04 is reached by having not taken the branch in BB03. The BB03 is reached by having not taken the branch in BB02. Lastly, BB02 is reached by having taken the branch in BB00.

To facilitate the discussion, at this point the term "trace" will be introduced. A trace represents a sequence of BBs (again, Basic Blocks) through which flow actually proceeds, where each such BB is referred to as a stage in the trace. In the context of example FIG. 2, and with the understanding of proceeding from less-recently passed-through stages (BBs) to more-recently passed-through stages (BBs), the trace can be represented as BB00→BB02→BB03→BB04→BB08→BB09→BB10. The trace in FIG. 2 can be also be described from the perspective of BB10 being the $(i+1)^{th}$ stage in the trace, i.e., BB10=stage(i+1). Thus, an alternative representation of the trace of FIG. 2 would be BB00=stage(i−5)←BB02=stage(i−4)←BB03=stage(i−3)←BB04=stage(i−2)←BB08=stage(i−1)←BB09=stage(i)←BB10=stage(i+1).

The BB10 includes the conditional branching instruction, "if (R4)," i.e., which is a function of the value in register R4. The value of R4 is determined in BB08, namely at the Register-Writing instruction, "R4=R1+R3." Hence, BB10 can be described as dependent upon BB08. There are two source registers recited in the Register-Writing instruction, "R4=R1+R3," the first source register being R1 and the second source register being R3.

The value of the second source register, namely R3, for the Register-Writing instruction of BB08 is determined in BB04. More particularly, the value of R3 is determined in BB08 at the Register-Writing instruction, "LD R3, MEM." As such, BB08 can be described as dependent upon BB04, and thus BB10 is dependent upon BB04. The BB04 is not dependent, however, upon another register value. Hence, register-dependency of BB10 vis-à-vis R3 can be described alternatively as being broken prior to BB04 or as beginning at BB04.

Returning to BB08 in FIG. 2, the value of the first source register, namely R1, for the Register-Writing instruction of BB08 is determined in BB03. More specifically, the value of R1 is determined in BB03 at the Register-Writing instruction, "R1=4." As such, BB08 also can be described as dependent upon BB03, and thus BB10 also is dependent upon BB03. The BB03 is not dependent, however, upon another register value. Hence, register-dependency of BB10 vis-à-vis R1 can be described alternatively as beginning at BB03 or as being broken prior to BB03.

The register-dependency of BB10 can be described as standing in the shadows 202 & 204 cast by the Register-Writing instructions of BB04 and BB03, respectively. Of the two, the longer shadow is cast by the Register-Writing instruction of BB03. The "shadow" phraseology will be discussed in more detail below.

In working toward improving branch history prediction, the present inventor realized the following (which forms a part of the present invention). Returning to the example of FIG. 2, specifically the conditional branching instruction in BB10, if a Branch History Table (BHT) was 4 bits in length, i.e., if M=4, then each of bits 0~3 in the entry for BB10 would strongly help to predict the direction to be taken upon execution of the conditional branching instruction in BB10. But if the BHT was 5 or greater bits in length, i.e., M≧5, then bits 0~3 would have stronger prediction-significance while bits 4~(M−1) would have relatively weaker prediction-significance. At best, the bits having weaker prediction-significance would not help to improve the accuracy of the prediction but merely represent overhead. At worst, the bits having weaker prediction-significance would have the effect of reducing the accuracy of the prediction. At least one embodiment of the present invention provides technology to adaptively filter out the bits having weaker prediction-significance that are present in an entry of the BHT while preserving those bits that are more strongly prediction-significant.

Figure 3A:
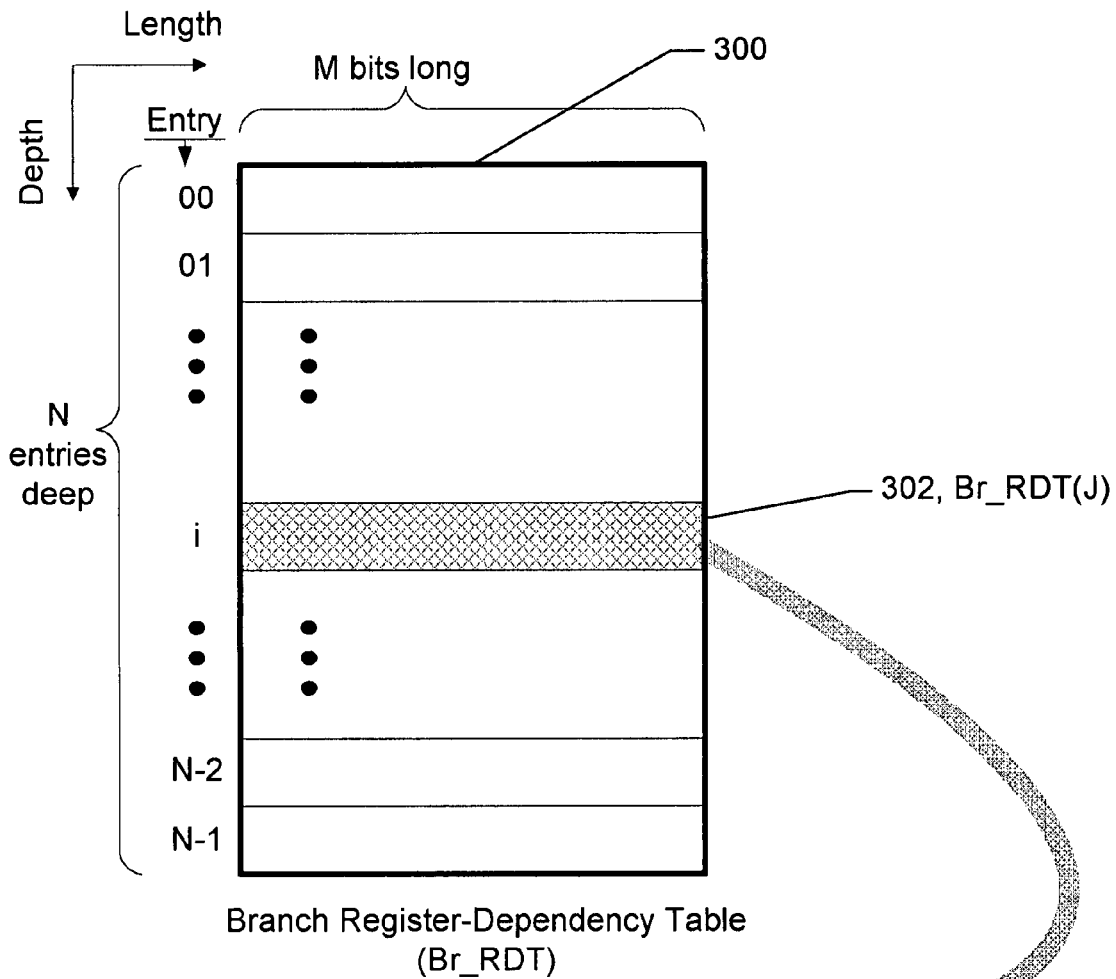
FIG. 3A is a symbolic depiction of a Branch Register-Dependency Table (Br_RDT) according to an example embodiment of the present invention.

FIG. 3A is a symbolic depiction of a Branch Register-Dependency Table (Br_RDT) 300 according to an example embodiment of the present invention.

The Br_RDT 300 of FIG. 3A stores shadow vectors that are used to mask, or preserve, that portion of an entry in a branch history table that is helpful for making a branch prediction, i.e., that portion containing prediction-significant bits. Assuming that the corresponding CPU (again, central processing unit) (not depicted in FIG. 3A, but see FIG. 4) in a processor (not depicted) includes N working registers, the Br_RDT 300 includes N entries (or rows), i.e., is N entries deep. Each entry is M bits long, where M is a positive integer. For example, see $j^{th}$ entry Br_RDT(j) 302. The value of M can be, e.g., fixed, and can be established as a part of the design process.

For example, Br_RDT can be represented by a plurality of shift registers (such as an array thereof) included in hardware comprising CPU 400, in a low-level cache type of Random Access Memory (RAM) provided for CPU 400, etc.

As will be explained in more detail below, all bits in each entry of Br_RDT 300 are updated whenever the CPU executes an instruction, where such updating is performed, e.g., by the CPU in general or by dedicated logic therein. In Br_RDT 300, time is viewed as elapsing from left to right. That is, the most recent update is located in the LSB position, while the oldest update is found in the MSB position. Updating Br_RDT 300 includes left-shifting each entry by one bit.

It is assumed that the next stage in the trace, i.e., a yet-to-be executed $(i+1)^{th}$ stage in the trace, namely stage(i+1), has a branching instruction that is conditional upon a $j^{th}$ register in the CPU, namely REG(j). In other words, REG(j) is the subject of the condition recited by the conditional branching instruction in the $(i+1)^{th}$ stage in the trace. It should be understood that the corresponding entry in the Br_RDT 300, namely Br_RDT(j), characterizes how the content of REG(j) is dependent upon preceding stages in the trace.

In addition, it should be understood that the columns of Br_RDT 300 are indicative to the effect of recently encountered stages upon the registers of the CPU. More particulary, the LSB column of Br_RDT 300, namely COL(0) represents the effect of stage stage(i) upon the registers of the CPU. Similarly, columns COL(1), . . . , COL(M−1) represent the effects of stage(i−1), . . . , stage(i−(M−1)) upon the registers of the CPU.

Figure 3B:
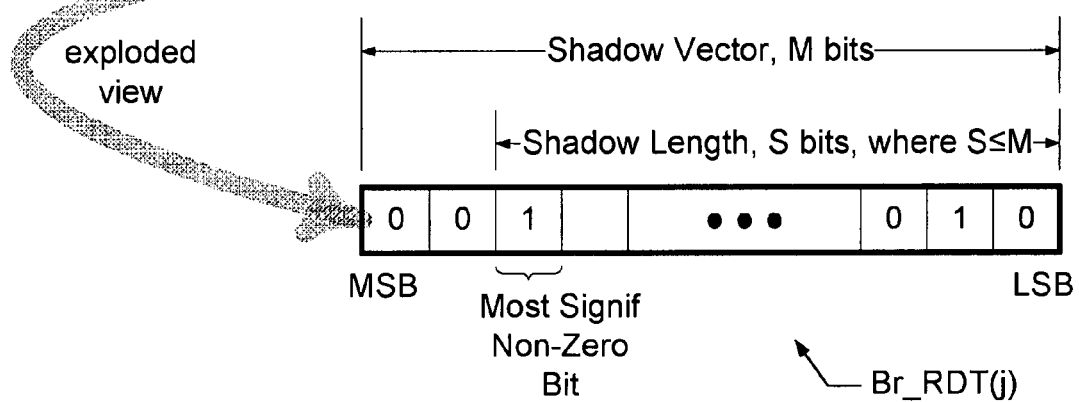
FIG. 3B is an exploded view of a $j^{th}$ entry in the Br_RDT, i.e., Br_RDT(j), according to an example embodiment of the present invention.

FIG. 3B is an exploded view of a $j^{th}$ entry in the Br_RDT, i.e., Br_RDT(j), according to an example embodiment of the present invention.

In FIG. 3B, a right-most bit is the least significant bit (LSB) while the left-most bit is the most significant bit (MSB). The most significant non-zero (MSNZB) (i.e., the left-most non-zero) bit defines a size, S (where S is a positive integer), of the longest shadow that falls upon the $(i+1)^{th}$ stage in the trace, namely stage(i+1). In other words, the $j^{th}$ entry in the Br_RDT 300, i.e., Br_RDT(j), is a shadow vector that describes what (if any) such shadows are cast upon stage(i+1) of the trace.

The content of Br_RDT(j) characterizes how the content of REG(j) is dependent upon one or more source registers due to the one or more source registers being recited in one or more preceding Register-Writing instructions, where the preceding Register-Writing instructions respectively recite the source registers as destination registers.

Accordingly, the "shadow" phraseology should be understood as follows. For a conditional branching instruction (CBI) having REG(j) as the subject of the recited condition, if the content of REG(j) is dependent upon at least one source register, then the CBI is described as standing in a shadow cast by at least one preceding trace in which the content of at least one source register is determined.

The LSB in Br_RDT(j) characterizes whether or not REG (j) is dependent upon stage(i), while the MSB characterizes whether or not REG(j) is dependent upon stage(i−(M−1)). The MSNZB indicates the stage whose Register-Writing instruction casts the longest shadow upon REG(j), i.e., indicates at stage(i+1) how far back into the trace the dependency of REG(j) reaches.

Carrying forward the example of FIG. 2 into FIG. 3B, recall that stage(i+1)=BB10 and assume that M=6. Hence, the LSB in Br_RDT(j) would characterize the dependency of REG(j) upon stage(i)=BB09, the MSB would characterize the dependency of REG(j) upon stage(i−(M−1))=stage(i−5)= BB00. Also, the MSNZB (again, most significant non-zero bit) would be bit 3, making S=4. Thus bit 3 would characterize a maximum reach of the dependency of REG(j) as extending back to stage(i−(S−1))=stage(i−3)=BB03.

Figure 4:
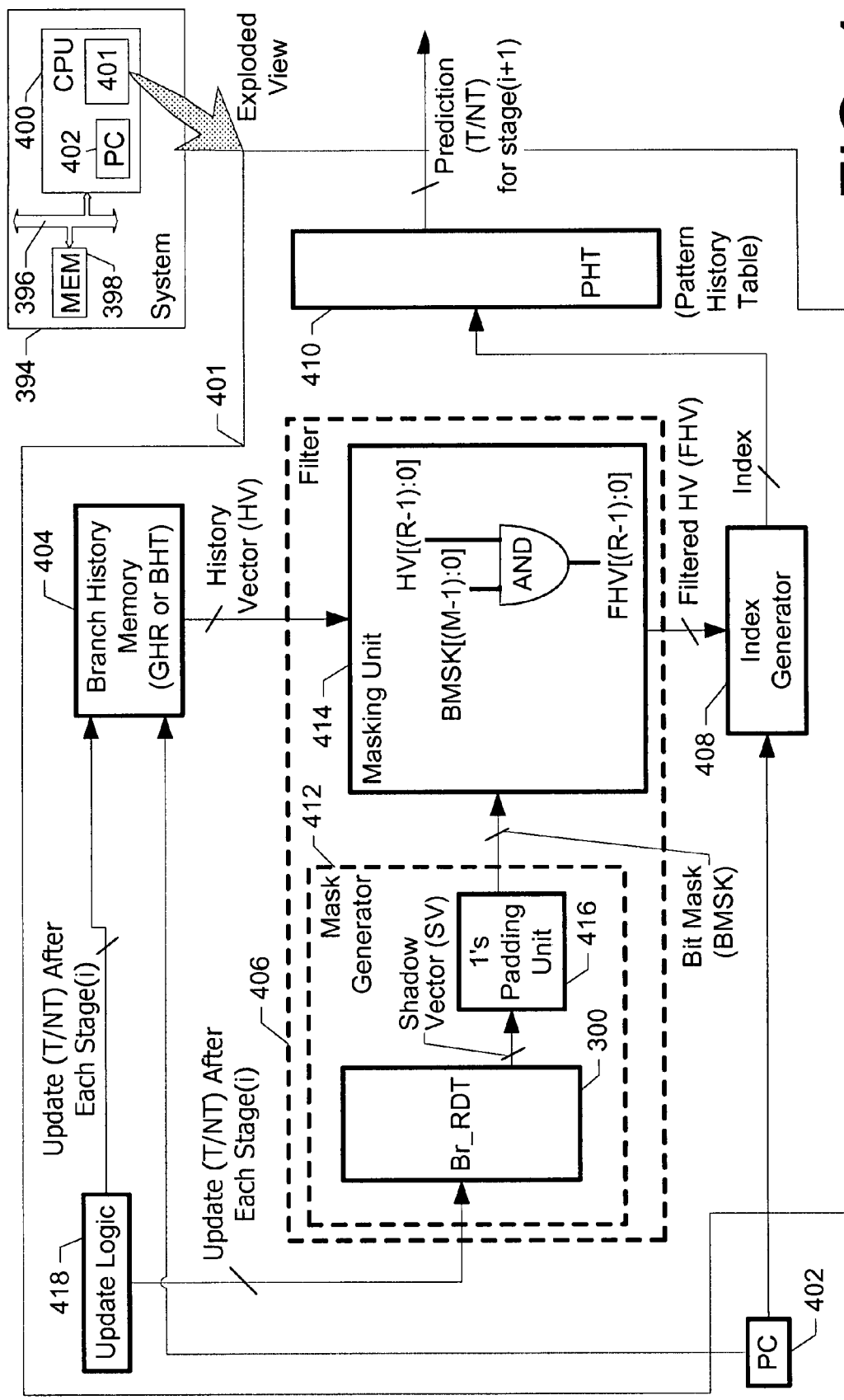
FIG. 4 is a block diagram of a branch-prediction apparatus in a CPU according to an example embodiment of the present invention.

FIG. 4 is a block diagram of a branch-prediction apparatus 401 in a CPU 400 according to an example embodiment of the present invention. In addition, FIG. 4 is a block diagram (according to an example embodiment of the present invention) of a computer system 394 that includes CPU 400.

Computer system 394 includes: a known system bus 396; a known memory 398; and CPU 400. Memory 398, for example, can include: volatile random-access-memory (RAM) integrated circuits (ICs), typically arranged in a tiered cache hierarchy; non-volatile RAM ICs, etc.

In FIG. 4, CPU 400 includes branch-prediction apparatus 401 and a PC 402. Branch-prediction apparatus 401 includes: a R-bit Branch History Memory (BHM) 404 that is N rows deep and R bits in length, where R is a positive integer; a filter 406; an index generator 408; a Pattern History Table (PHT) 410; and update logic 418. PC 402 is known. Known types of PHT 410 include, e.g., an array of saturating 2-bit counters in which a prediction by a given counter is reflected in the MSB thereof. There can be various combinations BHM 404, PC 402 and index generator 408, e.g., corresponding to various known combinations of (1) a known Global History Register (GHR) or a known Branch History Table (BHT), (2) known index generators and (3) known PHTs, respectively. Examples of such known combinations include: Gshare; Gseselect; Agree; Bi-Modal; YAGS (Yet Another Global Scheme); etc. Filter 406 can be applied to any of the various combinations BHM 404, PC 402 and index generator 408.

Filter 406 includes a mask generator 412 and a masking unit 414. Mask generator 412 includes Br_RDT 300 and a 1's-padding unit 416.

In operation, when a prediction is to be made regarding the conditional branching instruction of the next (yet-to-be-executed) stage in the trace, i.e., the conditional branching instruction of stage(i+1), a raw R-bit history vector (HV) is output from BHM 404. If BHM 404 takes the form of a BHT, then the raw history vector HV will represent the local branching history of the conditional branching instruction in stage(i+1) for the previous R executions of the conditional branching instruction. But if BHM 404 takes the form of a BHR, then the raw history vector HV will represent the global branching history for the respective conditional branching instructions in the previous R stages of the trace.

The raw history vector HV from BHM 404 is filtered by filter 406. More particularly, a logical operation is performed in masking unit 414 upon the raw history vector HV using a bit mask generated by 1's-padding unit 416, which (in effect) adjusts a length of raw history vector HV. To generate the bit mask, 1's-padding unit 416 operates upon the corresponding shadow vector output by Br_RDT 300. Again, the shadow vector output by Br_RDT 300 is the content of the entry in Br_RDT corresponding to REG(j) in the CPU 400, where REG(j) is the register upon which the conditional branching instruction in stage(i+1) is conditional.

Index generator 408 receives a filtered history vector HV from filter 406, and receives some or all, e.g., the lower order, of the address bits of PC 402. Recalling the circumstance in which BHM 404 takes the form of a BHT, the same portion of the address bits of PC 402 going to index generator 408 are also provided to BHM 404; such an optional sort of signal path is indicated in FIG. 4 via a dashed arrow from PC 408 to BHM 404. Based upon the received data, index generator 408 generates an index that is used to index into PHT 410. Each location in PHT contains a historically-based branch prediction. The branch prediction (T or NT) contained in the location accessed via the index from index generator is output by PHT 410 as the branch prediction for stage(i+1).

Branch-prediction apparatus 401 can be described as a two-level predictor. The first level leverages the historical information in BHM 404, and further can be described as culminating in the index generated by index generator 408. The second level leverages the historical information accumulated in PHT 410, and can be described as culminating in the prediction output by PHT 410.

Figure 5:
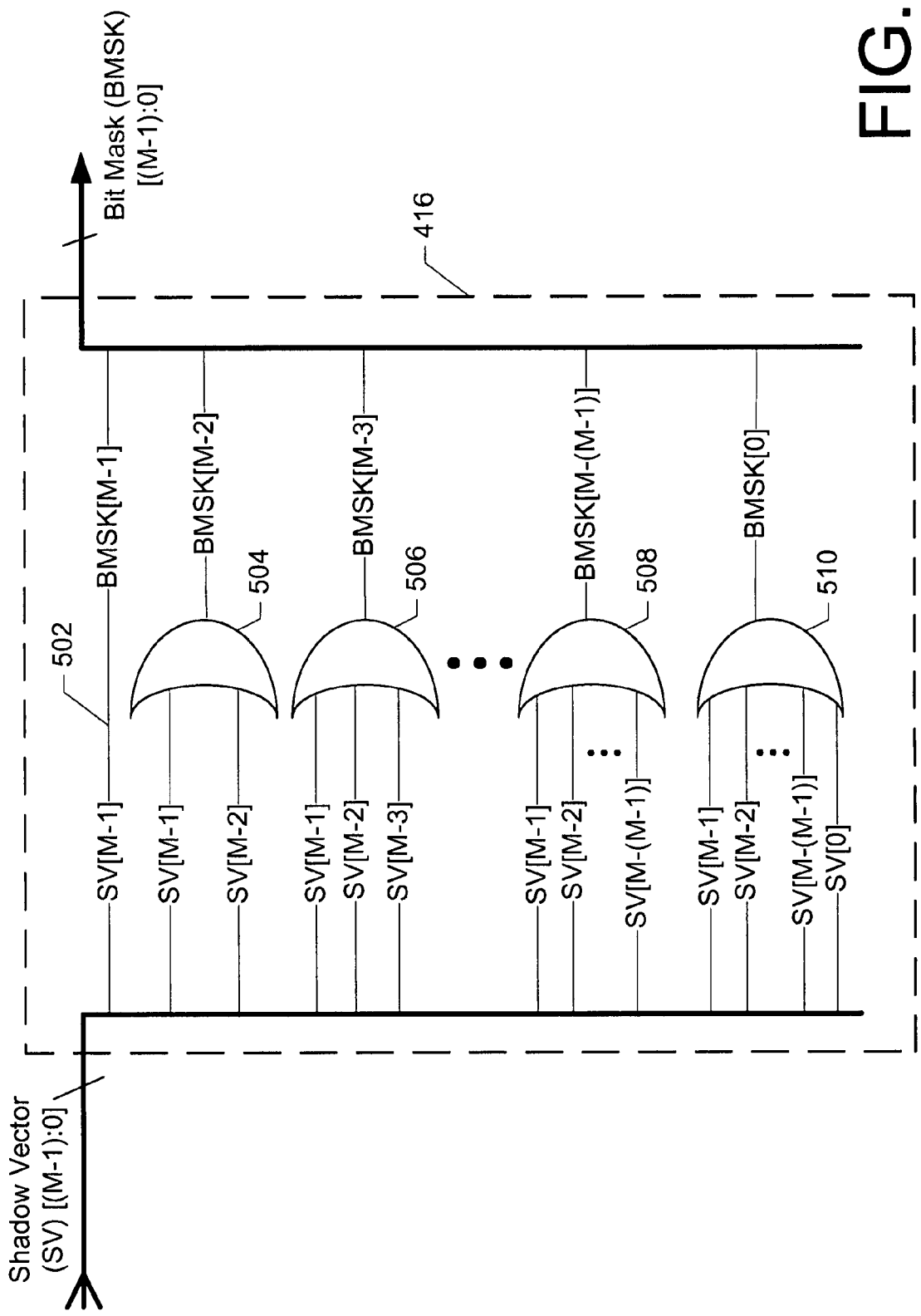
FIG. 5 is a more detailed schematic diagram (according to an example embodiment of the present invention) of a 1's-padding unit.

FIG. 5 is a more detailed schematic diagram (according to an example embodiment of the present invention) of a 1's-padding unit, e.g., 416.

In FIG. 5, 1's-padding unit 416 receives the M-bit shadow vector (SV) from Br_RDT 300 (not shown in FIG. 5), where the SV has bits M−1, . . . , 1, 0, i.e., SV [(M−1):0]. The 1's-padding unit 416 produces an M-bit bit mask (BMSK), i.e., BMSK [(M−1):0]. Included within 1's-padding unit 416 are a plurality of logical OR gates 504-510.

The MSB of the shadow vector SV, namely SV[M−1] is not subjected to a logical OR operation, but instead is directly connected as the MSB (also known as the cutoff bit) of the bit mask BMSK, namely BMSK[M−1]. The OR gate 504 operates upon bits SV[M−1] and SV[M−2], i.e., SV[(M−1):(M−2)], of the shadow vector SV to produce bit BMSK[M−2] of the mask BMSK. The OR gate 506 operates upon bits SV[(M−1):(M−3)] of the shadow vector SV to produce bit BMSK[M−3] of the mask BMSK. The OR gate 508 operates upon bits SV[(M−1):(M−(M−1))], i.e., SV[(M−1):1], of the shadow vector SV to produce bit BMSK[M−(M−1)], i.e., BMSK[1], of the mask BMSK. The OR gate 510 operates upon bits SV[(M−1):0] of the shadow vector SV to produce bit BMSK[0] of the mask BMSK.

In operation, 1's-padding unit 416 functions to do at least the following: set a value of logical one in the cutoff bit of bit mask BMSK corresponding to the most significant non-zero bit (again, MSNZB) of the shadow vector SV; and set all less significant bits, relative to the cutoff bit, in the bit mask BMSK to a value of logical one. For example, if M=8 and SV=00010100, then the MSNZB in the shadow vector SV is SV[4], which makes S=5. In this example, BMSK=00011111. In other words, the corresponding MSNZB of the bit mask BMSK, namely BMSK[4], as well as the less significant bits (namely BMSK[3:0]), are set to a value of logical one.

Returning to the discussion of FIG. 4, masking unit 414 can take the form (for example) of a logical AND gate that performs a bitwise logical AND operation upon the bit mask BMSK and the raw history vector HV. Typically, there will be fewer or the same number (M) of bits in bit mask BMSK as the number of bits (R) in the HV, i.e., M≦R. If M<R, then the bit mask BMSK and the raw history vector HV will be aligned beginning at the LSB such that BMSK[0] aligns with HV[0], i.e., BMSK[0]↔HV[0], BMSK[1]↔HV[1], . . . , BMSK[S−1]↔HV[S−1], . . . , BMSK[M−1]↔HV[M−1].

Filter 406, via masking unit 414, produces a filtered HV (FHV), i.e., a version of the raw history vectory HV whose length has been adjusted. It should be understood that a function of filter 406 is to retain (in the FHV) the portion of the unfiltered HV which is more helpful for making a branch prediction, i.e., the portion which is more strongly prediction-significant. A function of filter 406 also is to reduce (if not eliminate) the portion of the unfiltered HV that represents weaker prediction-significance bits in the filtered HV. In other words, filter 406 produces a filtered (or length-adjusted) branch-prediction predicate.

Alternatively, implementations of 1's-padding unit 416 and masking unit 414 other than those discussed above are contemplated. In other words, the nature of combinatorial logic lends itself to there being multiple implementations contemplated for the filter function (namely, retaining the portion of the unfiltered HV representing stronger prediction-significance bits while discarding the portion representing weaker prediction-significance bits).

The above-described architecture for branch prediction is based upon an assumption that a value of logical one is used to denote a branch taken (T), etc. Consequently, the above-described architecture makes use of concepts such as the MSNZB (again, most-significant non-zero bit), which influences the configurations of masking unit 414, 1's-padding unit 416, index generator 408, etc. Alternatively, the architecture can be based upon a presumption that a logical zero is used to denote a branch taken (T), etc., such that corresponding albeit logically converse configurations of the various components would be employed.

Figure 14:
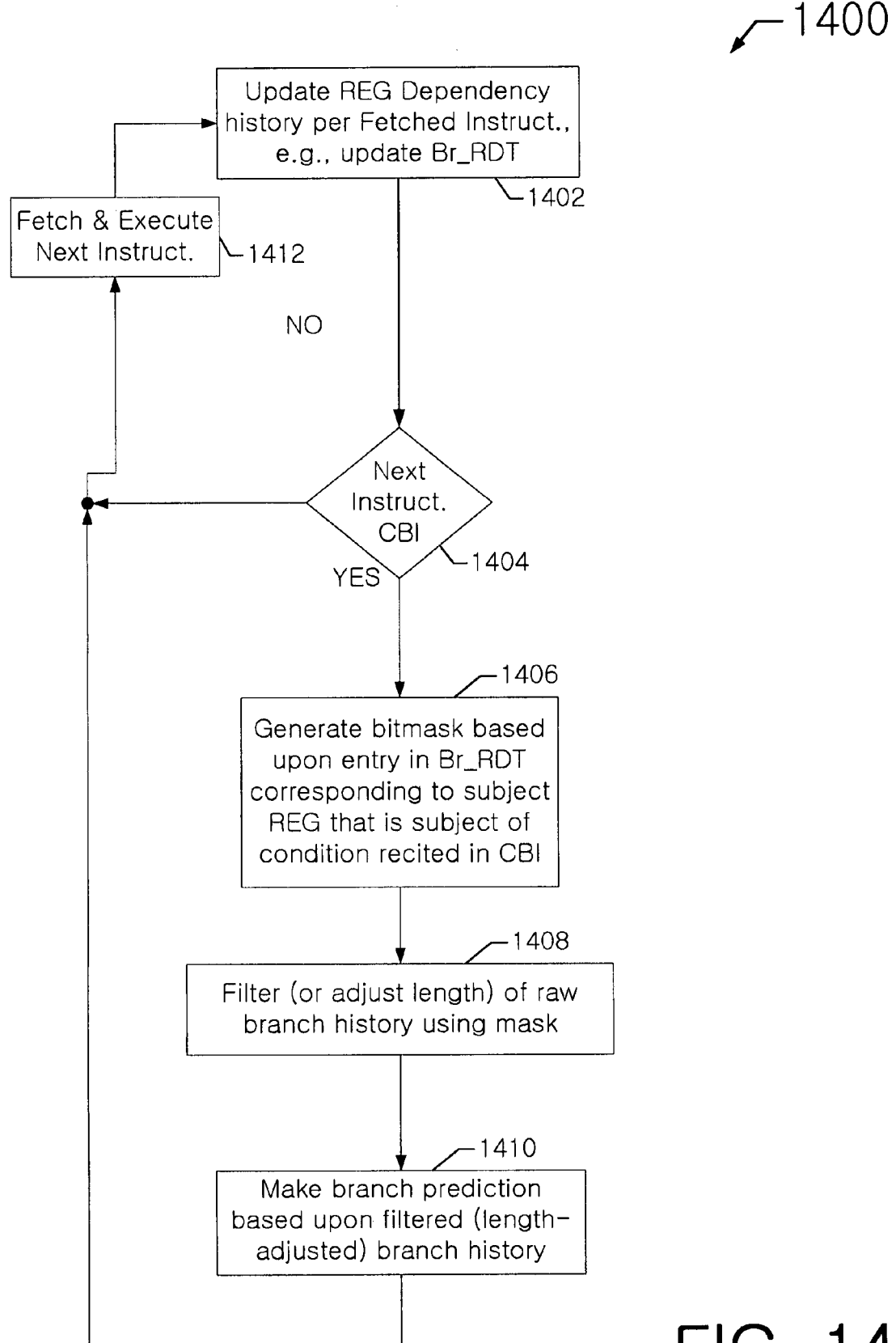
FIG. 14 depicts a flowchart of a method (according to an example embodiment of the present invention) of making a branch prediction based upon a filtered branch-prediction predicate.

FIG. 14 depicts a flowchart 1400 of a method (according to an example embodiment of the present invention) of making a branch prediction based upon a filtered branch-prediction predicate (or length-adjusted branch-prediction predicate).

The method of flowchart 1400 can be carried out by, e.g., branch prediction apparatus 401, or by CPU 400 in general.

In flowchart 1400, flow begins at block 1402, where entries in Br_RDT 300 are updated according to the results of the instruction that was previously executed. Of course, if this is the first pass through block 1402, then no results are available on which to base the update, hence such an update will have little (if any effect). From block 1402, flow proceeds to decision block 1404. At decision block 1404, it is determined whether a branch-prediction is to be made regarding the next instruction to be executed. That is, in block 1404, it is determined whether the next instruction is a conditional branching instruction (again CBI). If not, then flow proceeds to block 1412, where the next instruction is executed. From block 1412, flow loops back to block 1402 (discussed above).

However, if it is determined at block 1404 that a branch-prediction is to be made, then flow proceeds to block 1406. At block 1406, a bit mask BMSK is generated based upon an entry in Br_RDT 300 corresponding to the register that is the subject of the condition recited by the conditional branching instruction, i.e., corresponding to a subject register (REG_subj). From block 1406, flow proceeds to block 1408. At block 1408, a raw history vector (HV) (that otherwise would represent the branch-prediction predicate according to the Background Art) is filtered (or length-adjusted) using the bit mask BMSK to produce a filtered branch history (FHV) (or length-adjusted branch-prediction predicate). Flow proceeds from block 1408 to block 1410. At block 1410, a branch prediction is made using the filtered branch history FHV as the prediction predicate. From block 1410, flow proceeds to block 1412 (discussed above).

Now, a first algorithm (according to an example embodiment of the present invention) for updating Br_RDT 300 will be discussed in the context of the example of FIG. 2. It is to be recalled that Br_RDT 300 is used to obtain a filtered history vectory (again, FHV), i.e., to adjust a length of a raw HV (history vector), hence such an algorithm can be described as being used indirectly to adjust the length of a raw branch history. Such an algorithm is applied each time that a CPU, e.g., CPU 400, executes an instruction. Such an algorithm can be implemented, e.g., in hardware comprising CPU 400 such as update logic 418, in a microprogram executed by CPU 400, in firmware, etc. Thus, an example of a device that can execute such an algorithm is CPU 400.

The first algorithm is as follows.

ALGORITHM (1)

IF (Conditional Branching Instruction) {

$$\left\{ \begin{array}{l} \text{if subject dependent on source reg then:} \\ \text{Br\_RDT(REG\_subj)} \leftarrow \\ \text{Br\_RDT(REG\_src1)} \vee \ldots \vee \text{Br\_RDT(Reg\_srcQ)} \\ \text{if subject NOT dependent on source reg NOT then:} \\ \text{Br\_RDT(REG\_subj)} \leftarrow \text{Br\_RDT(REG\_subj)} \end{array} \right\} ;$$

Br_RDT(s) << 1, for each s, where for s=<0, 1, . . . , N−1>;
}
ELSE IF (UNconditional Branching Instruction) {
    Make no change to Br_RDT(REG_subj)
    Br_RDT(s) << 1, for each s, where s=<0, 1, . . . , N−1>;
}
ELSE IF (Register-Writing Instruction reciting source register) {
    Br_RDT(REG_dst) ← [[00 . . . 01]˅ Br_RDT(Reg_src1) ˅ . . .
        . . . ˅ Br_RDT(Reg_srcP)]
}

| ALGORITHM | (1) |
|---|---|
| ELSE IF (Register-Writing Instruction NOT reciting source register) {<br>    Br_RDT(REG_dst) ← [00 . . . 00];<br>} | | wherein, for the IF instruction,

Br_RDT(REG_subj) indicates the register, namely REG_subj, that is the subject of the condition in the conditional branching instruction, it is assumed that there are Q source registers upon which the subject register REG_subj is dependent, Q being a positive integer, the symbol ← indicates that the result of a bitwise logical operation is to be bitwise written into an entry in Br_RDT, e.g., Br_RDT(REG_subj), the symbol ∨ denotes a logical OR operation, the symbol << denotes a one-bit left-shift operator, the string "<<1" indicates a one-bit left-shift with a value of logical zero being inserted into the LSB, Br_RDT(REG_src1) indicates the entry in Br_RDT 300 corresponding to the first source register upon which subject register depends, Br_RDT(REG_srcQ) indicates the entry in Br_RDT 300 corresponding to the $Q^{th}$ source register upon which subject register depends; and

[00 . . . 01] indicates an M-bit word in which only the LSB is set to a value of logical one;

[00 . . . 00] indicates an M-bit word in which all bits are set to a value of logical zero;

wherein, for the ELSE IF instruction,

Br_RDT(REG_dst) indicates the entry in Br_RDT 300 corresponding to the destination register into which the Register-Writing Instruction will write data, it is assumed that there are P source registers to which the Register-Writing instruction refers, i.e., P source registers which supply data to the Register-Writing Instruction, P being a positive integer, and Br_RDT(REG_src1) indicates the entry in Br_RDT 300 corresponding to the first source register referenced by the Register-Writing Instruction, and Br_RDT(REG_srcP) indicates the entry in Br_RDT 300 corresponding to the $P^{th}$ source register upon which subject register depends, In a less mathematical manner, Algorithm No. 1 can be described as follows.

In Algorithm No. 1, when CPU 400 operates upon a conditional branching instruction, CPU 400 or update logic 418 also will update an entry in Br_RDT 300, namely Br_RDT(REG_subj), corresponding to the subject of the condition recited in the conditional branching instruction. The update includes writing a vector of bits into the subject register Br_RDT(REG_subj). The vector of bits is obtained by bitwise OR'ing (performing a logical OR operation upon) the following operands: the contents of the entries in Br_RDT 300 corresponding to the source registers (assuming there is at least one) upon which the subject register Br_RDT(REG_subj) depends, it being assumed that there are Q source registers upon which the subject register REG_subj is dependent. Then each of the N entries in Br_RDT 300 is (A) left-shifted one bit position followed by (B) a logical value of zero being set in the LSB. If the branching instruction is unconditional, then no change is made to Br_RDT(REG_subj), though the left shift upon Br_RDT 300 would still be performed.

Further as to Algorithm No. 1, when CPU 400 operates upon a Register-Writing instruction, CPU 400 or update logic 418 also will update an entry in Br_RDT 300, namely Br_RDT(REG_dst), corresponding to the destination register into which the Register-Writing Instruction will write data. The update includes writing a vector of bits into the destination register Br_RDT(REG_dst). The vector of bits is obtained by bitwise OR'ing (performing a logical OR operation upon) the following operands: the content of each source register (assuming there is at least one) recited in the Register-Writing instruction, namely Br_RDT(REG_src1)~Br_RDT (REG_srcP), it being assumed that there P source registers to which the Register-Writing instruction refers, i.e., P source registers which supply data to the Register-Writing Instruction; and a binary value "1", which is represented in bit notation as [00 . . . 01]. If the Register-Writing instruction does not refer to any source registers, then there is nothing other than the binary value "1" to be OR'd, hence the entry in Br_RDT 300 for the source register would be set to the bit pattern [00 . . . 01].

Figure 12:
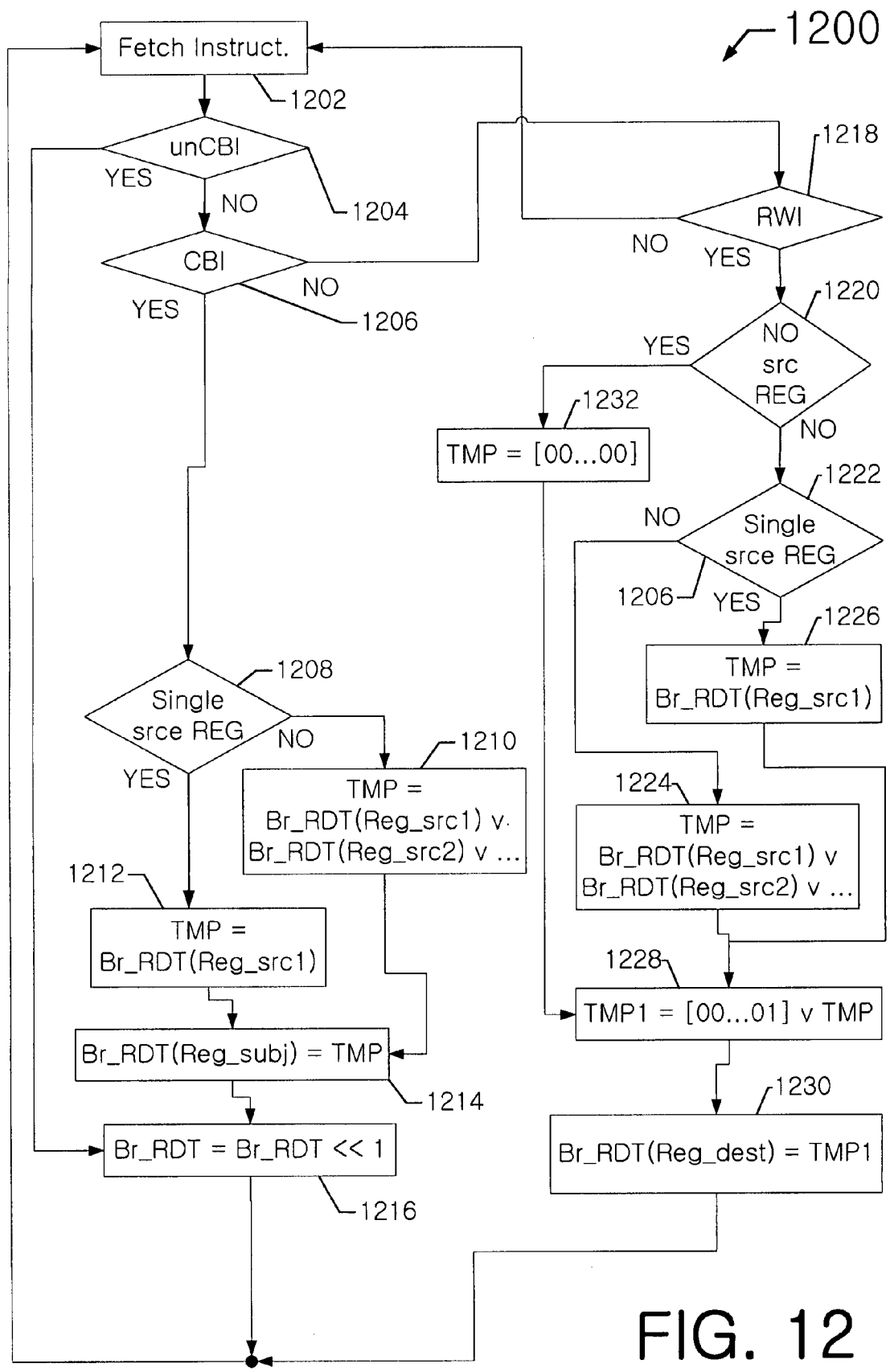
FIG. 12 depicts a flowchart of a method (according to an example embodiment of the present invention) by which Algorithm No. 1 can be implemented by update logic, or generally by a CPU, etc.

FIG. 12 depicts a flowchart 1200 of a method (according to an example embodiment of the present invention) by which Algorithm No. 1 can be implemented by update logic 418, or generally by CPU 400, etc.

In FIG. 12, flow begins at block 1202, where CPU 400 fetches the next instruction that is to be executed. Flow proceeds to decision block 1204, where it is determined whether the instruction is an unconditional branching instruction (unCBI). If so, then flow proceeds to block 1216, where each of the N entries in Br_RDT 300, is (A) left-shifted one bit position followed by (B) a logical value of zero being set in the LSB. From block 1216, flow loops back up to block 1202 (discussed above).

However, if the branching instruction is determined not to be unconditional at block 1202, then flow proceeds to decision block 1206. At block 1206, it is determined whether the instruction is a conditional branching instruction (again, CBI). If so, then flow proceeds to block 1208.

At block 1208, it is determined whether there is only a single source register (REG_src1) upon which the subject register REG_subj is dependent. If not, i.e., if there are multiple source registers, then flow proceeds to block 1210. At block 1210, CPU 400 produces a vector of bits TMP that will be used to overwrite an entry in Br_RDT 300, namely Br_RDT(REG_subj), corresponding to the subject of the condition recited in the conditional branching instruction. The vector of bits TMP is obtained by bitwise OR'ing (performing a logical OR operation) upon the contents of the entries in Br_RDT 300 corresponding to the source registers (again, it having been determined in block 1208 that there are at least two upon which REG_subj is dependent. Flow proceeds from block 1210 to block 1214, where Br_RDT(REG_subj) is overwritten with the vector of bits TMP. Flow proceeds from block 1214 to block 1216 (discussed above).

However, if it is determined at block 1208 that there is only a single source register (REG_src1) upon which the subject register REG_subj depends, then flow proceeds to block 1212. Block 1212 is very similar to block 1210 except that there is only one source register for the bitwise OR operation. In such a circumstance, the bitwise OR procedure has only REG_src1 upon which to operate, hence block 1212 shows the bit vector TMP as being set equal to REG_src1. Flow proceeds from block 1212 to block 1214 (discussed above).

Looking back at block 1205, if it is determined there that the instruction is not a conditional branching instruction, then flow proceeds to decision block 1218. At decision block 1218, it is determined whether the instruction is a Register-Writing instruction. If not, the flow loops back to block 1202 (discussed above). If so, i.e., if the instruction is determined to be a Register-Writing instruction, then flow proceeds to decision block 1220.

At block 1220, it is determined whether there is at least one source register recited by the Register-Writing instruction. If so, then flow proceeds to block 1222. At block 1222, it is determined whether there is only a single source register (REG_src1) to which the Register-Writing instruction refers. If not, i.e., if there are multiple source registers, then flow proceeds to block 1224.

At block 1224, CPU 400 produces a vector of bits TMP that will be indirectly used to overwrite an entry in Br_RDT 300, namely Br_RDT(REG_dst), corresponding to the destination register REG_dst into which the Register-Writing Instruction will write data. The vector of bits TMP is obtained by bitwise OR'ing the contents of the entries in Br_RDT 300 corresponding to the source registers (again, it having been determined in block 1222 that there are two or more to which the Register-Writing instruction refers). Flow proceeds to block 1228, where another vector of bits TMP1 is obtained by bitwise OR'ing the content of the vector of bits TMP and a binary value of one ([00 . . . 01]. Flow proceeds from block 1228 to block 1230, where Br_RDT(REG_dst) is overwritten with the vector of bits TMP1. Flow proceeds from block 1230 to block 1202 (discussed above).

However, if it is determined at block 1222 that there is only a single source register (REG_src1) recited by the Register-Writing instruction, then flow proceeds to block 1226. Block 1226 is very similar to block 1224 except that there is only one source register for the bitwise OR operation. In such a circumstance, the bitwise OR procedure has only REG_src1 upon which to operate, hence block 1226 shows the bit vector TMP as being set equal to REG_src1. Flow proceeds from block 1226 to block 1228 (discussed above).

Looking back at block 1220, if it is determined that there is no source register recited by the Register-Writing instruction, then flow proceeds to block 1232. At block 1232, the vector of bits TMP is set to a binary value of zero ([00 . . . 00]. Flow proceeds from block 1232 to block 1228 (discussed above).

FIGS. 6A-6K depict respective states of a Branch Register-Dependency Table (again, Br_RDT) 600 resulting from CPU 400 using Algorithm No. 1 to update Br_RDT 600 as flow progresses under the specific (but not limiting) circumstances of the example of FIG. 2.

Figures 6A, 6B, 6C, 6D, 6E, 6F:
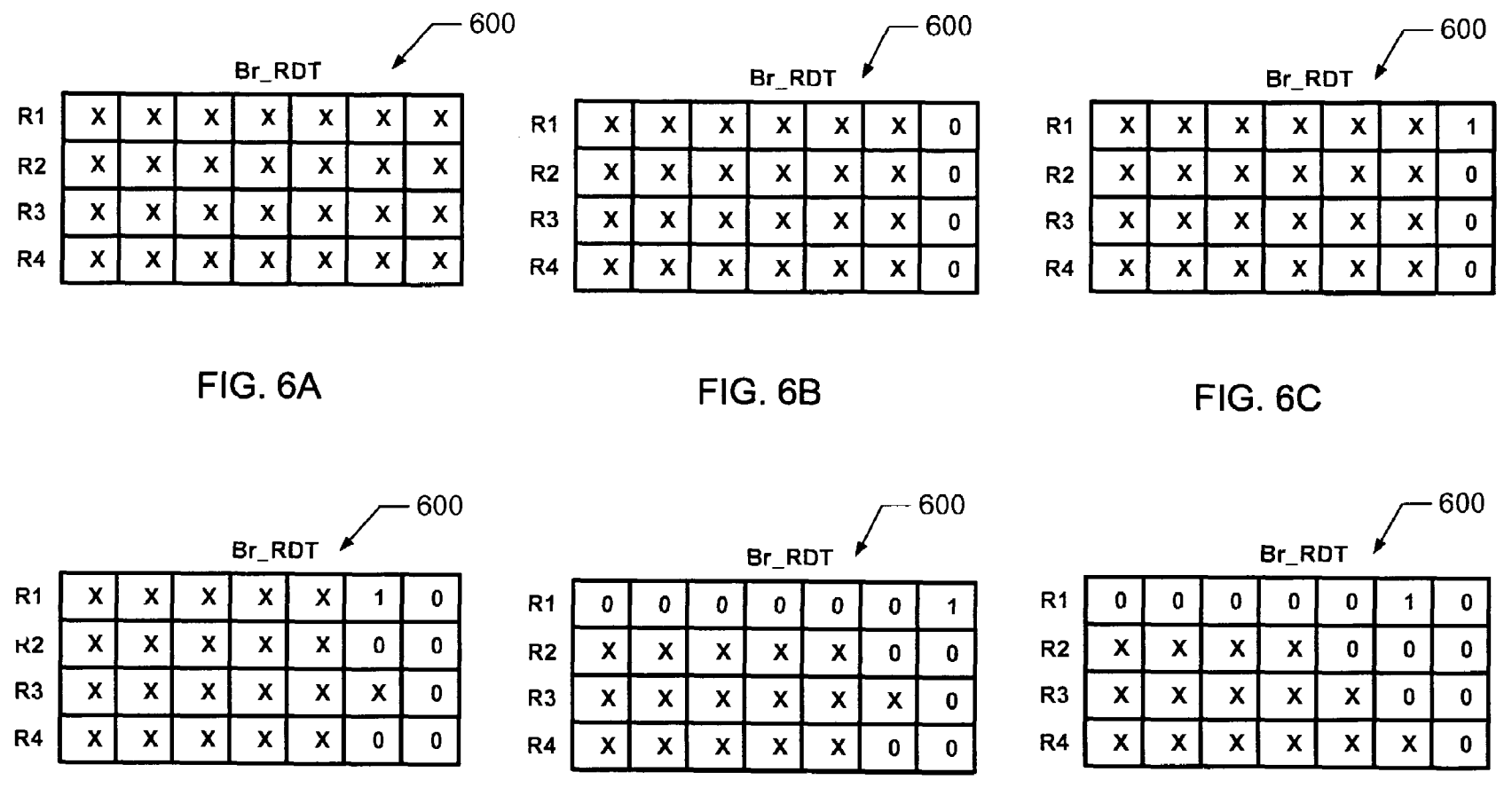

In FIGS. 6A-6K, CPU 400 is assumed to include at least four registers, hence Br_RDT 600 includes at least four rows, i.e., $N \geq 4$, and $M=7$. This discussion begins upon flow entering BB00, hence the bit values for each entry in Br_RDT 600 are treated as if they are unknown, which in FIG. 6A is indicated via the depiction in each bit position of an "X".

At the end of BB01, CPU 400 encounters the conditional branching instruction "if (R2);" here, it should be understood that the subject register REG_subj is R2. At this point, it is not known if there are any source registers upon which the subject register R2 is dependent, hence (for the OR operation) the corresponding entries in Br_RDT 600 cannot be determined, so Br_RDT(R2) is depicted with all X values, which essentially effects no change. This is the state depicted in FIG. 6A. Then, all entries in Br_RDT 600 are left-shifted once and a value of logical zero is set in the respective LSBs. Flow then exits BB00, which is the state depicted in FIG. 6B.

FIG. 6B can also be described as depicting the state of Br_RDT 600 upon flow entering BB02. In BB02, CPU 400 encounters the Register-Writing instruction "R1=R2+R3" here, it should be understood that the destination register REG_dst is R1 and the first & second source registers REG_src1 & REG_src2 are R2 & R3. The entries Br_RDT(R2) & Br_RDT(R3) and a binary value "1" are bitwise OR'd together and the result is put into Br_RDT(R1), i.e., the entry in Br_RDT 600 corresponding to the destination register R1. After the OR operation, only the value of the LSB in Br_RDT (R1) is known, i.e., Br_RDT(R1)[0]=1. Hence, bits Br_RDT (R1)[6:1] are depicted with an X value. This is the state depicted in FIG. 6C.

Next in the progression through BB02, CPU 400 encounters the conditional branching instruction "if (R3)." At this point, it is not known if there are any source registers upon which the subject register R3 is dependent, hence (for the OR operation) the corresponding entries in Br_RDT 600 cannot be determined, so Br_RDT(R3) is populated with all X values. Then, all entries in Br_RDT 600 are left-shifted once and a value of logical zero is set in the respective LSBs. Flow then exits BB02, which is the state depicted in FIG. 6D.

FIG. 6D can also be described as depicting the state of Br_RDT 600 upon flow entering BB03. In BB03, CPU 400 encounters the Register-Writing instruction "R1=4;" here, it should be understood that the destination register REG_dst is R1. As no source register is recited in this Register-Writing instruction, Br_RDT(R1) is set to the bit pattern [00 . . . 01]. This is the state depicted in FIG. 6E.

Next in the progression through BB03, CPU 400 encounters the conditional branching instruction "if (R4)." At this point, it is not known if there are any source registers upon which the subject register R4 is dependent, hence (for the OR operation) the corresponding entries in Br_RDT 600 cannot be determined, so Br_RDT(R4) is populated with all X values. Then, all entries in Br_RDT 600 are left-shifted once and a value of logical zero is set in the respective LSBs. Flow then exits BB03, which is the state depicted in FIG. 6F.

FIG. 6F can also be described as depicting the state of Br_RDT 600 upon flow entering BB04. In BB04, CPU 400 encounters the Register-Writing instruction "LD R3, MEM;" here, it should be understood that the destination register REG_dst is R3. As no source register is recited in this Register-Writing instruction, Br_RDT(R3) is set to the bit pattern [00 . . . 01]. This is the state depicted in FIG. 6G.

Next in the progression through BB04, CPU 400 encounters the conditional branching instruction "if (R1)." At this point, it is known that the subject register R1 is independent of any other source register (due to the Register-Writing instruction in BB03), so nothing is done to Br_RDT(R1). Then, all entries in Br_RDT 600 are left-shifted once and a value of logical zero is set in the respective LSBs. Flow then exits BB04, which is the state depicted in FIG. 6H.

Figures 6G, 6H, 6I, 6J, 6K, 7:
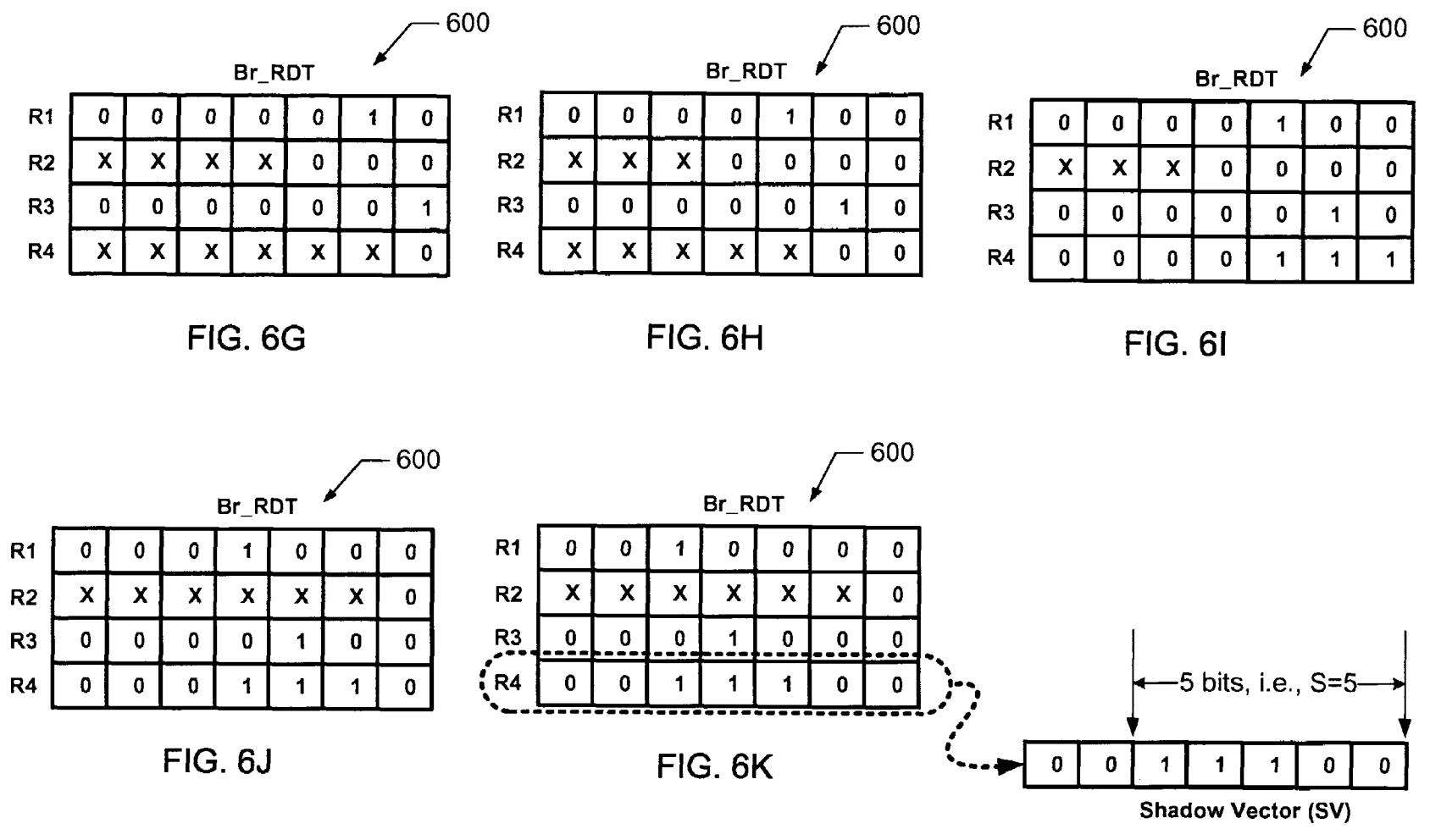

FIG. 6H can also be described as depicting the state of Br_RDT 600 upon flow entering BB08. In BB08, CPU 400 encounters the Register-Writing instruction "R4=R1+R3;" here, it should be understood that the destination register REG_dst is R4 and the first & second source registers REG_src1 & REG_src2 are R1 & R3. The entries Br_RDT(R1) & Br_RDT(R3) and a binary value "1" are bitwise OR'd together and the result is put into Br_RDT(R4). This is the state depicted in FIG. 6I.

Next in the progression through BB08, CPU 400 encounters the conditional branching instruction "if (R2)." At this point, it remains unknown if there are any source registers upon which the subject register R2 is dependent, hence (for the OR operation) the corresponding entries in Br_RDT 600 cannot be determined, so Br_RDT(R2) is depicted with all X values, which essentially effects no change. Then, all entries in Br_RDT 600 are left-shifted once and a value of logical zero is set in the respective LSBs. Flow then exits BB08, which is the state depicted in FIG. 6J.

FIG. 6J can also be described as depicting the state of Br_RDT 600 upon flow entering BB09. In BB09, CPU 400 encounters the conditional branching instruction "if (R2)" without first encountering another Register-Writing instruction. At this point, it remains unknown if there are any source registers upon which the subject register R2 is dependent, hence (for the OR operation) the corresponding entries in Br_RDT 600 cannot be determined, so Br_RDT(R2) is depicted with all X values, which essentially effects no change. Then, all entries in Br_RDT 600 are left-shifted once and a value of logical zero is set in the respective LSBs. Flow then exits BB09, which is the state depicted in FIG. 6K.

In terms of FIG. 6K, stage(i) in the trace (or the $i^{th}$ stage) is BB09. A branch prediction can be made regarding the next stage, i.e., the yet-to-be executed stage(i+1)=BB10. In BB10, the conditional branching instruction is "If (R4)." It should be understood that the state of Br_RDT(R4) in FIG. 6K characterizes how the content of R4 (which is the subject register in the conditional branching instruction of stage(i+1)=BB10) is dependent upon preceding stages (namely, i, i−1, i−2, . . . , i−5) in the trace. Hence, for the branch prediction regarding stage(i+1)=BB10 vis-a-vis FIG. 6, the content of Br_RDT (R4) is output as the shadow vector SV, which is depicted in FIG. 7.

FIG. 7 depicts a shadow vector output from Br_RDT (again, Branch Register-Dependency Table) 600 resulting from CPU 400 using Algorithm No. 1 to update Br_RDT 600 as culminated in FIG. 6K under the specific (but not limiting) circumstances of the example of FIG. 2.

In FIG. 7, the shadow vector SV has bit 5 as the MSNZB (again, most significant non-zero bit), hence S=5. This indicates that the Register-Writing instruction in BB02 casts the longest shadow upon the subject register R4 in the conditional branching instruction, i.e., indicates how far back into the trace the dependency of R4 reaches at BB10.

Now, a second algorithm (according to an example embodiment of the present invention) for updating Br_RDT 300 will be discussed in the context of the example of FIG. 2. The second algorithm can be used instead of the first algorithm.

The second algorithm is as follows.

ALGORITHM (2)

IF (Conditional Branching Instruction) { if subject dependent on source reg then:
        Br_RDT(REG_subj) ←
        Br_RDT(REG_src1) ∨ ... ∨ Br_RDT(Reg_srcQ)    ;
    if subject NOT dependent on source reg NOT then:
        Br_RDT(REG_subj) ← Br_RDT(REG_subj)

Br_RDT(s) << 1, for each s, where for s=<0, 1, . . . , N−1>;
Br_RDT(REG_subj) ← [[00 . . . 01] ˅ Br_RDT(Reg_subj)];
Br_RDT(REG_src1) ← [[00 . . . 01] ˅ Br_RDT(Reg_src1)];   (a)
  (b)
.
.
.
Br_RDT(REG_srcQ) ← [[00 . . . 01] ˅ Br_RDT(Reg_srcQ)];   (c)
}
ELSE IF (UNconditional Branching Instruction) {
    Make no change to Br_RDT(REG_subj)
    Br_RDT(s) << 1, for each s, where for s=<0, 1, . . . , N−1>;
    }
ELSE IF (Register-Writing Instruction reciting source register) {
    Br_RDT(REG_dst) ← [Br_RDT(Reg_src1) ˅ . . . ˅ Br_RDT(Reg_srcP];
    }
ELSE IF (Register-Writing Instruction NOT reciting source register) {
    Br_RDT(REG_dst) ← [00 . . . 00];
    } wherein Algorithm No. 2 differs from Algorithm No. 1 in terms of the IF statement additionally reciting sub-portions (a)~(c), also the ELSE IF statement differs.

In a less mathematical manner, Algorithm No. 2 can be described as follows.

In Algorithm No. 2, when CPU 400 operates upon a Register-Writing instruction, CPU 400 also will update an entry in Br_RDT 300, namely Br_RDT(REG_dst), in the same way as Algorithm No. 1 except for the following. Though the vector of bits for the update is obtained by bitwise OR'ing the content of each source register recited in the Register-Writing instruction, namely Br_RDT(REG_src1)~Br_RDT(REG_srcP), the OR operation does not include a binary value "1" as one of the operands. Also, if the Register-Writing instruction does not refer to any source registers, then all bits of the destination register Br_RDT(REG_dst) are set to zero.

In Algorithm No. 2, when CPU 400 operates upon a conditional branching instruction, CPU 400 also will update an entry in Br_RDT 300, namely Br_RDT(REG_subj), in the same way as Algorithm No. 1. In addition, CPU 400 also will update entries in Br_RDT 300 corresponding to the source registers (assuming there is at least one recited in the conditional branching instruction) upon which the subject register Br_RDT(REG_subj) depends by writing vectors of bits into the respective entries in Br_RDT 300. For the entry Br_RDT (REG_src1) corresponding to the first source register REG_src1, the vector of bits is obtained by bitwise OR'ing the following operands: the content of Br_RDT(REG_src1); and a binary value "1", which is represented in bit notation as [00 . . . 01]. If the conditional branching instruction does not refer to any source registers, then there is nothing other than the binary value "1" to be OR'd, hence Br_RDT(REG_src1) would be set to the bit pattern [00 . . . 01]. This is repeated for each entry in Br_RDT 300 corresponding to a remaining source register upon which the subject register Br_RDT (REG_subj) depends. Thus, for the entry Br_RDT(REG_srcQ) corresponding to the $Q^{th}$ source register REG_srcQ, the vector of bits is obtained by bitwise OR'ing the following operands: the content of Br_RDT(REG_srcQ); and a binary value "1."

If the branching instruction is unconditional, then (as in Algorithm No. 1) Algorithm No. 2 would make no change to Br_RDT(REG_subj), and further would make no change to any of Br_RDT(REG_src1)~Br_RDT(REG_srcQ). Like Algorithm No. 1, however, Algorithm No. 2 would still perform the left shift upon Br_RDT 300.

Figure 13:
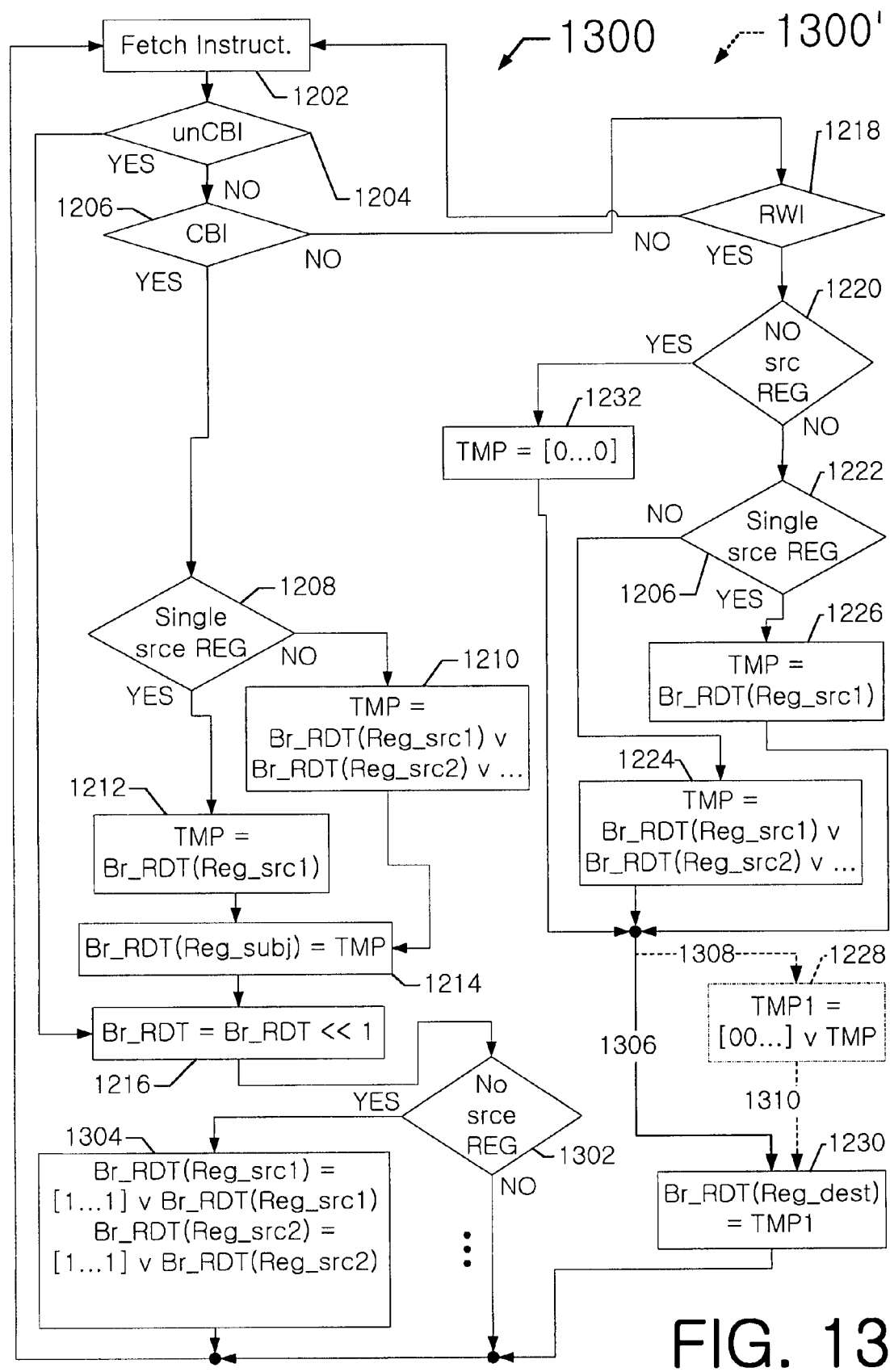
FIG. 13 depicts a flowchart of a method (according to an example embodiment of the present invention) by which Algorithm No. 2 can be implemented by update logic, or generally by CPU, etc.

FIG. 13 depicts a flowchart 1300 of a method (according to an example embodiment of the present invention) by which Algorithm No. 2 can be implemented by update logic 418, or generally by CPU 400, etc.

Flowchart 1300 of FIG. 13 is very similar to flowchart 1200 of FIG. 12. For brevity, only differences will be discussed. A first difference is that flow does not proceed from block 1216 (discussed above) to block 1202 (discussed above). Rather, flow proceeds from block 1216 to decision block 1302. At block 1302, it is determined if there are no source registers upon which the subject register REG_subj is dependent. If so, i.e., if there are no such source registers, then flow proceeds to block 1202 (disused above). If not, i.e., if there are source registers, then flow proceeds to block 1304. At block 1304, each entry in Br_RDT 300 corresponding to a source register is overwritten by bitwise OR'ing itself with a binary value of one ([00 . . . 01]. Flow proceeds from block 1304 to block 1202 (discussed above).

A second difference between flowchart 300 and flowchart 200 is as follows. In flowchart 1300, flow does not proceed from blocks 1224, 1226 and 1232 to block 1228, rather flow proceeds to block 1230, as indicated by arrow 1306.

FIGS. 8A-8K depict respective states of a Branch Register-Dependency Table (again, Br_RDT) 800 resulting from CPU 400 using Algorithm No. 1 to update Br_RDT 800 as flow progresses under the specific (but not limiting) circumstances of the example of FIG. 2.

In FIGS. 8A-8K, CPU 400 is assumed to include at least four registers, hence Br_RDT 800 includes at least four rows, i.e., N≧4, and M=7. This discussion begins upon flow entering BB00, hence the bit values for each entry in Br_RDT 800 are treated as if they are unknown, which in FIG. 8A is indicated via the depiction in each bit position of an "X".

At the end of BB01, CPU 400 encounters the conditional branching instruction "if (R2);" here, it should be understood that the subject register REG_subj is R2. At this point, it is not known if there are any source registers upon which the subject register R2 is dependent, hence (for the OR operation) the corresponding entries in Br_RDT 800 cannot be determined, so Br_RDT(R2) is depicted with all X values, which essentially effects no change. This is the state depicted in FIG. 8A.

Subsequently, all entries in Br_RDT 800 are left-shifted once and a value of logical zero is set in the respective LSBs. Then the entry in Br_RDT 300 for the subject register R2, namely Br_RDT(R2), is updated by bitwise OR'ing the following operands: the content of Br_RDT(R2); and a binary value "1", which is represented in bit notation as [00 . . . 01]. Before the OR operation, none of the values of the bits in Br_RDT(R2) is known, i.e., Br_RDT(R1)[7:0]=0000000. After the OR operation, only the value of the LSB in Br_RDT(R2) is known, i.e., Br_RDT(R2)[0]=1. Hence, bits Br_RDT(R2)[6:1] are depicted with an X value. The source registers at this point, again, are unknown. As no source registers can be identified at this point, no OR operation can be performed upon source registers at this point. Flow then exits BB00, which is the state depicted in FIG. 8B.

FIG. 8B can also be described as depicting the state of Br_RDT 800 upon flow entering BB02. In BB02, CPU 400 encounters the Register-Writing instruction "R1=R2+R3" here, it should be understood that the destination register REG_dst is R1 and the first & second source registers REG_src1 & REG_src2 are R2 & R3. The entries Br_RDT(R2) & Br_RDT(R3) are bitwise OR'd together and the result is put into Br_RDT(R1), i.e., the entry in Br_RDT 800 corresponding to the destination register R1. After the OR operation, only the value of the LSB in Br_RDT(R1) is known, i.e., Br_RDT(R1)[0]=1. Hence, bits Br_RDT(R1)[6:1] are depicted with an X value, while Br_RDT(R1)[0]=1. This is the state depicted in FIG. 8C.

Next in the progression through BB02, CPU 400 encounters the conditional branching instruction "if (R3)." At this point, it is not known if there are any source registers upon which the subject register R3 is dependent, hence (for the OR operation) the corresponding entries in Br_RDT 800 cannot be determined, so Br_RDT(R3) is populated with all X values. Subsequently, all entries in Br_RDT 800 are left-shifted once and a value of logical zero is set in the respective LSBs.

Then the entry in Br_RDT 300 for the subject register R3, namely Br_RDT(R3), is updated by bitwise OR'ing the following operands: the content of Br_RDT(R3); and a binary value "1". Before the OR operation, only the value of the LSB of Br_RDT(R3) is known (LSB=0), i.e., Br_RDT(R3)[7:0]= XXXXXX0. After the OR operation, only the value of the LSB in Br_RDT(R3) is known, i.e., Br_RDT(R3)[0]=1. The source registers at this point, again, are unknown. As no source registers can be identified at this point, no OR operation can be performed upon source registers at this point. Flow then exits BB02, which is the state depicted in FIG. 8D.

FIG. 8D can also be described as depicting the state of Br_RDT 800 upon flow entering BB03. In BB03, CPU 400 encounters the Register-Writing instruction "R1=4;" here, it should be understood that the destination register REG_dst is R1. As no source register is recited in this Register-Writing instruction, Br_RDT(R1) is set to the bit pattern [00 . . . 00]. This is the state depicted in FIG. 8E.

Next in the progression through BB03, CPU 400 encounters the conditional branching instruction "if (R4)." At this point, it is not known if there are any source registers upon which the subject register R4 is dependent, hence (for the OR operation) the corresponding entries in Br_RDT 800 cannot be determined, so Br_RDT(R4) is populated with all X values. Subsequently, all entries in Br_RDT 800 are left-shifted once and a value of logical zero is set in the respective LSBs.

Then the entry in Br_RDT 300 for the subject register R4, namely Br_RDT(R4), is updated by bitwise OR'ing the following operands: the content of Br_RDT(R4); and a binary value "1". Before the OR operation, only the value of the LSB of Br_RDT(R4) is known (LSB=0), i.e., Br_RDT(R4)[7:0]= XXXXXX0. After the OR operation, only the value of the LSB in Br_RDT(R3) is known, i.e., Br_RDT(R3)[0]=1. The source registers at this point, again, are unknown. As no source registers can be identified at this point, no OR operation can be performed upon source registers at this point. Flow then exits BB03, which is the state depicted in FIG. 8F.

FIG. 8F can also be described as depicting the state of Br_RDT 800 upon flow entering BB04. In BB04, CPU 400 encounters the Register-Writing instruction "LD R3, MEM;" here, it should be understood that the destination register REG_dst is R3. As no source register is recited in this Register-Writing instruction, Br_RDT(R3) is set to the bit pattern [00 . . . 00]. This is the state depicted in FIG. 8G.

Next in the progression through BB04, CPU 400 encounters the conditional branching instruction "if (R1)." At this point, it is known that the subject register R1 is independent of any other source register (due to the Register-Writing instruction in BB03), so nothing is done to Br_RDT(R1). Subsequently, all entries in Br_RDT 800 are left-shifted once and a value of logical zero is set in the respective LSBs.

Then Br_RDT(R1) is updated by bitwise OR'ing the following operands: the content of Br_RDT(R1); and a binary value "1". As the subject register R1 is independent of any source registers, there are no source registers upon which the corresponding OR operation should be performed, hence no OR operations are performed at this point. Flow then exits BB04, which is the state depicted in FIG. 8H.

FIG. 8H can also be described as depicting the state of Br_RDT 800 upon flow entering BB08. In BB08, CPU 400 encounters the Register-Writing instruction "R4=R1+R3;" here, it should be understood that the destination register REG_dst is R4 and the first & second source registers REG_src1 & REG_src2 are R1 & R3. The entries Br_RDT(R1) & Br_RDT(R3) and a binary value "1" are bitwise OR'd together and the result is put into Br_RDT(R4). This is the state depicted in FIG. 8I.

Next in the progression through BB08, CPU 400 encounters the conditional branching instruction "if (R2)." At this point, it remains unknown if there are any source registers upon which the subject register R2 is dependent, hence (for the OR operation) the corresponding entries in Br_RDT 800 cannot be determined, so Br_RDT(R2) is depicted with all X values. Then, all entries in Br_RDT 800 are left-shifted once and a value of logical zero is set in the respective LSBs.

Then Br_RDT(R2), is updated by bitwise OR'ing the following operands: the content of Br_RDT(R2); and a binary value "1". Before the OR operation, none of the values of Br_RDT(R2) was known, i.e., Br_RDT(R4)[7:0]= XXXXXXXX. After the OR operation, only the value of the LSB in Br_RDT(R2) is known, i.e., Br_RDT(R2)[0]=1. The source registers at this point, again, are unknown. As no source registers can be identified at this point, no OR operation can be performed upon source registers at this point. Flow then exits BB08, which is the state depicted in FIG. 8J.

FIG. 8J can also be described as depicting the state of Br_RDT 800 upon flow entering BB09. In BB09, CPU 400 encounters the conditional branching instruction "if (R2)" without first encountering another Register-Writing instruction. At this point, it remains unknown if there are any source registers upon which the subject register R2 is dependent, hence (for the OR operation) the corresponding entries in Br_RDT 800 cannot be determined, so Br_RDT(R2) is depicted with all X values. Subsequently, all entries in Br_RDT 800 are left-shifted once and a value of logical zero is set in the respective LSBs.

Then Br_RDT(R2), is updated by bitwise OR'ing the following operands: the content of Br_RDT(R2); and a binary value "1". Before the OR operation, none of the values of Br_RDT(R2) was known, i.e., Br_RDT(R4)[7:0]= XXXXXXXX. After the OR operation, only the value of the LSB in Br_RDT(R2) is known, i.e., Br_RDT(R2)[0]=1. The source registers at this point, again, are unknown. As no source registers can be identified at this point, no OR operation can be performed upon source registers at this point. Flow then exits BB09, which is the state depicted in FIG. 8K.

In terms of FIG. 8K, stage(i) in the trace (or the $i^{th}$ stage) is BB09. A branch prediction can be made regarding the next stage, i.e., the yet-to-be executed stage(i+1)=BB10. In BB10, the conditional branching instruction is "If (R4)." It should be understood that the state of Br_RDT(R4) in FIG. 8K characterizes how the content of R4 (which is the subject register in the conditional branching instruction of stage(i+1)=BB10) is dependent upon preceding stages (namely, i, i−1, i−2, . . . , i−5) in the trace. Hence, for the branch prediction regarding stage(i+1)=BB10 vis-a-vis FIG. 8K, the content of Br_RDT (R4) is output as the shadow vector SV, which is depicted in FIG. 9.

FIG. 9 depicts a shadow vector output from Br_RDT (again, Branch Register-Dependency Table) 800 resulting from CPU 400 using Algorithm No. 2 to update Br_RDT 800 as culminated in FIG. 8K under the specific (but not limiting) circumstances of the example of FIG. 2.

In FIG. 9, the shadow vector SV has the third bit (i.e., bit 2) as the MSNZB (again, most significant non-zero bit), hence S=3. This refers to indicates that the Register-Writing instruction in BB04 casts the longest shadow upon the subject register R4 of the conditional branching instruction in BB10, i.e., indicates how far back into the trace the dependency of R4 reaches at BB10.

Now, a third algorithm (according to an example embodiment of the present invention) for updating Br_RDT 300 will be discussed in the context of the example of FIG. 2. The third algorithm is a combination of the first and second algorithms. The third algorithm can be used instead of the first or second algorithms. The third algorithm is as follows.

ALGORITHM (3)

IF (Conditional Branching Instruction) {

$$\left\{\begin{array}{l} \text{if subject dependent on source reg then:} \\ \quad \text{Br\_RDT(REG\_subj)} \leftarrow \\ \quad \text{Br\_RDT(REG\_src1)} \vee \ldots \vee \text{Br\_RDT(Reg\_srcQ)} \\ \text{if subject NOT dependent on source reg NOT then:} \\ \quad \text{Br\_RDT(REG\_subj)} \leftarrow \text{Br\_RDT(REG\_subj)} \end{array}\right\};$$

Br_RDT(s) << 1, for each s, where for s=<0, 1, . . ., N−1>;
Br_RDT(REG_subj) ← [[00 . . . 01] ˇ Br_RDT(Reg_subj)];
Br_RDT(REG_src1) ← [[00 . . . 01] ˇ Br_RDT(Reg_src1)];
.
.
.
Br_RDT(REG_srcQ) ← [[00 . . . 01] ˇ Br_RDT(Reg_srcQ)];
}
ELSE IF (UNconditional Branching Instruction) {
    Make no change to Br_RDT(REG_subj)
    Br_RDT(s) << 1, for each s, where for s=<0, 1, . . . , N−1>;
}
ELSE IF (Register-Writing Instruction reciting source register) {
    Br_RDT(REG_dst) ← [[00 . . . 01] ˇ Br_RDT(Reg_src1) ˇ . . .
        . . . ˇ Br_RDT(Reg_srcP)];
}
ELSE IF (Register-Writing Instruction NOT reciting source register) {
    Br_RDT(REG_dst) ← [00 . . . 00];
} wherein the IF statement of Algorithm No. 3 is the same as in Algorithm No. 2, and the ELSE IF statement of Algorithm 3 is the same as in Algorithm No. 1.

As an alternative, FIG. 13 can be regarded also as depicting a flowchart 1300' of a method (according to an example embodiment of the present invention) by which Algorithm No. 3 can be implemented by a CPU, e.g., 400.

Flowchart 1300' is very similar to flowchart 1300, except for the following. In flowchart 1300', flow proceeds from blocks 1224, 1226 and 1232 to block 1228, as in flowchart 1200. This difference is called out in FIG. 3 by block 1228 being depicted with dashed lines, and arrows 1308 & 1310 leading respectively to & from block 1228 being depicted in dashed lines.

FIGS. 10A-10K depict respective states of a Branch Register-Dependency Table (again, Br_RDT) 1000 resulting from CPU 400 using Algorithm No. 3 to update Br_RDT 1000 as flow progresses under the specific (but not limiting) circumstances of the example of FIG. 2.

Figures 10G, 10H, 10I, 10J, 10K, 11:
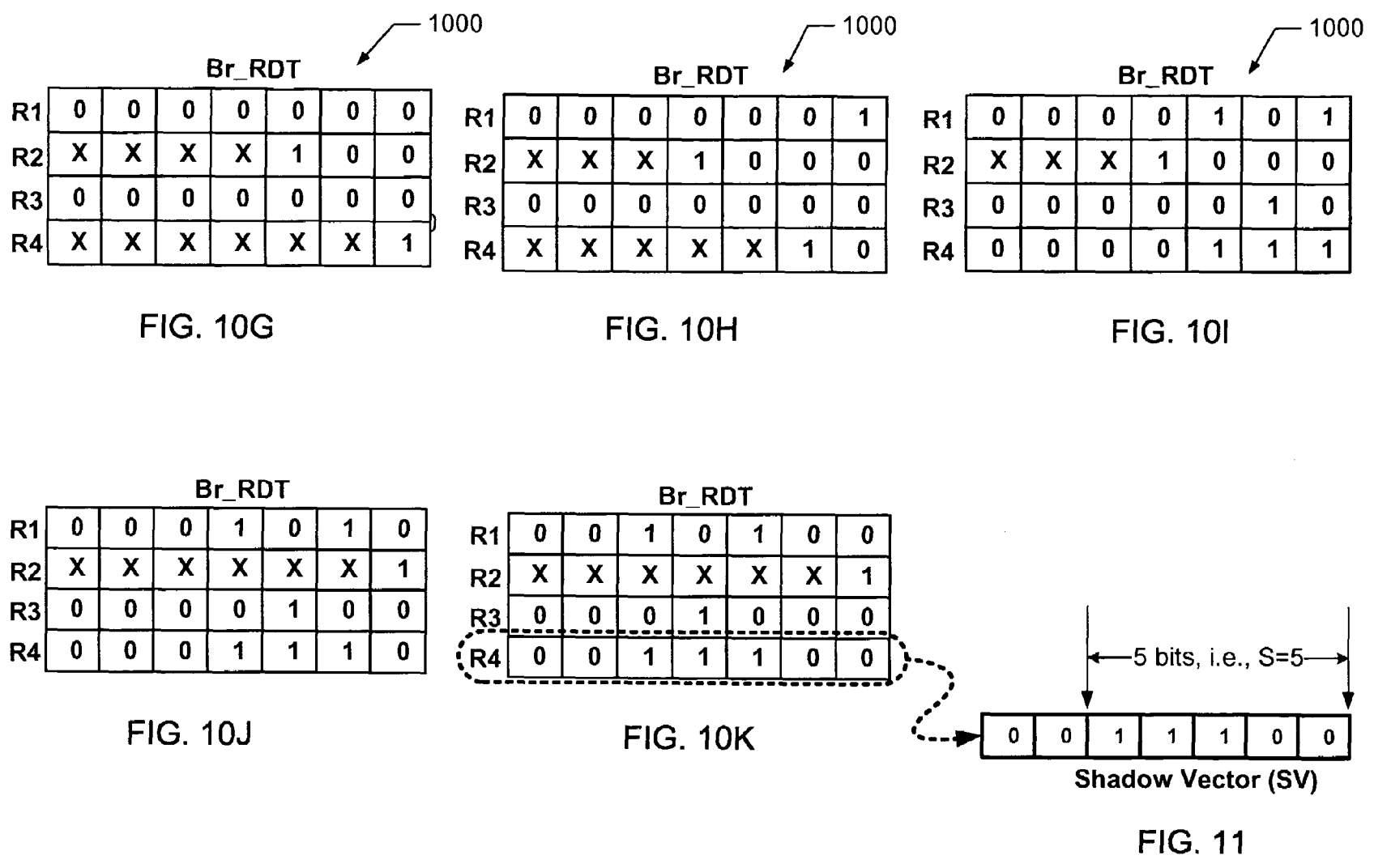

In FIGS. 10A-10K, CPU 400 is assumed to include at least four registers, hence Br_RDT 1000 includes at least four rows, i.e., N≧4, and M=7. This discussion begins upon flow entering BB00, hence the bit values for each entry in Br_RDT 1000 are treated as if they are unknown, which in FIG. 10A is indicated via the depiction in each bit position of an "X".

At the end of BB01, CPU 400 encounters the conditional branching instruction "if (R2);" here, it should be understood that the subject register REG_subj is R2. At this point, it is not known if there are any source registers upon which the subject register R2 is dependent, hence (for the OR operation) the corresponding entries in Br_RDT 1000 cannot be determined, so Br_RDT(R2) is depicted with all X values, which essentially effects no change. This is the state depicted in FIG. 10A.

Subsequently, all entries in Br_RDT 1000 are left-shifted once and a value of logical zero is set in the respective LSBs. Then the entry in Br_RDT 300 for the subject register R2, namely Br_RDT(R2), is updated by bitwise OR'ing the following operands: the content of Br_RDT(R2); and a binary value "1", which is represented in bit notation as [00 . . . 01]. Before the OR operation, none of the values of the bits in Br_RDT(R2) is known, i.e., Br_RDT(R1)[7:0]=0000000. After the OR operation, only the value of the LSB in Br_RDT (R2) is known, i.e., Br_RDT(R2)[0]=1. Hence, bits Br_RDT (R2)[6:1] are depicted with an X value. The source registers at this point, again, are unknown. As no source registers can be identified at this point, no OR operation can be performed upon source registers at this point. Flow then exits BB00, which is the state depicted in FIG. 10B.

FIG. 10B can also be described as depicting the state of Br_RDT 1000 upon flow entering BB02. In BB02, CPU 400 encounters the Register-Writing instruction "R1=R2+R3" here, it should be understood that the destination register REG_dst is R1 and the first & second source registers REG_src1 & REG_src2 are R2 & R3. The entries Br_RDT(R2) & Br_RDT(R3) are bitwise OR'd together and the result is put into Br_RDT(R1), i.e., the entry in Br_RDT 1000 corresponding to the destination register R1. After the OR operation, only the value of the LSB in Br_RDT(R1) is known, i.e., Br_RDT(R1)[0]=1. Hence, bits Br_RDT(R1)[6:1] are depicted with an X value, while Br_RDT(R1)[0]=1. This is the state depicted in FIG. 10C.

Next in the progression through BB02, CPU 400 encounters the conditional branching instruction "if (R3)." At this point, it is not known if there are any source registers upon which the subject register R3 is dependent, hence (for the OR operation) the corresponding entries in Br_RDT 1000 cannot be determined, so Br_RDT(R3) is populated with all X values. Subsequently, all entries in Br_RDT 1000 are left-shifted once and a value of logical zero is set in the respective LSBs.

Then the entry in Br_RDT 300 for the subject register R3, namely Br_RDT(R3), is updated by bitwise OR'ing the following operands: the content of Br_RDT(R3); and a binary value "1". Before the OR operation, only the value of the LSB of Br_RDT(R3) is known (LSB=0), i.e., Br_RDT(R3)[7:0]= XXXXXX0. After the OR operation, only the value of the LSB in Br_RDT(R3) is known, i.e., Br_RDT(R3)[0]=1. The source registers at this point, again, are unknown. As no source registers can be identified at this point, no OR operation can be performed upon source registers at this point. Flow then exits BB02, which is the state depicted in FIG. 10D.

FIG. 10D can also be described as depicting the state of Br_RDT 1000 upon flow entering BB03. In BB03, CPU 400 encounters the Register-Writing instruction "R1=4;" here, it should be understood that the destination register REG_dst is R1. As no source register is recited in this Register-Writing instruction, Br_RDT(R1) is set to the bit pattern [00 . . . 00]. This is the state depicted in FIG. 10E.

Next in the progression through BB03, CPU 400 encounters the conditional branching instruction "if (R4)." At this point, it is not known if there are any source registers upon which the subject register R4 is dependent, hence (for the OR operation) the corresponding entries in Br_RDT 1000 cannot be determined, so Br_RDT(R4) is populated with all X values. Subsequently, all entries in Br_RDT 1000 are left-shifted once and a value of logical zero is set in the respective LSBs.

Then the entry in Br_RDT 300 for the subject register R4, namely Br_RDT(R4), is updated by bitwise OR'ing the following operands: the content of Br_RDT(R4); and a binary value "1". Before the OR operation, only the value of the LSB of Br_RDT(R4) is known (LSB=0), i.e., Br_RDT(R4)[7:0]= XXXXXX0. After the OR operation, only the value of the LSB in Br_RDT(R3) is known, i.e., Br_RDT(R3)[0]=1. The source registers at this point, again, are unknown. As no source registers can be identified at this point, no OR operation can be performed upon source registers at this point. Flow then exits BB03, which is the state depicted in FIG. 10F.

FIG. 10F can also be described as depicting the state of Br_RDT 1000 upon flow entering BB04. In BB04, CPU 400 encounters the Register-Writing instruction "LD R3, MEM;" here, it should be understood that the destination register REG_dst is R3. As no source register is recited in this Register-Writing instruction, Br_RDT(R3) is set to the bit pattern [00 . . . 00]. This is the state depicted in FIG. 10G.

Next in the progression through BB04, CPU 400 encounters the conditional branching instruction "if (R1)." At this point, it is known that the subject register R1 is independent of any other source register (due to the Register-Writing instruction in BB03), so nothing is done to Br_RDT(R1). Subsequently, all entries in Br_RDT 1000 are left-shifted once and a value of logical zero is set in the respective LSBs.

Then Br_RDT(R1) is updated by bitwise OR'ing the following operands: the content of Br_RDT(R1); and a binary value "1". As the subject register R1 is independent of any source registers, there are no source registers upon which the corresponding OR operation should be performed, hence no OR operations are performed at this point. Flow then exits BB04, which is the state depicted in FIG. 10H.

FIG. 10H can also be described as depicting the state of Br_RDT 1000 upon flow entering BB010. In BB010, CPU 400 encounters the Register-Writing instruction "R4=R1+R3;" here, it should be understood that the destination register REG_dst is R4 and the first & second source registers REG_src1 & REG_src2 are R1 & R3. The entries Br_RDT(R1) & Br_RDT(R3) and a binary value "1" are bitwise OR'd together and the result is put into Br_RDT(R4). This is the state depicted in FIG. 10I.

Next in the progression through BB010, CPU 400 encounters the conditional branching instruction "if (R2)." At this point, it remains unknown if there are any source registers upon which the subject register R2 is dependent, hence (for the OR operation) the corresponding entries in Br_RDT 1000 cannot be determined, so Br_RDT(R2) is depicted with all X values. Then, all entries in Br_RDT 1000 are left-shifted once and a value of logical zero is set in the respective LSBs.

Then Br_RDT(R2), is updated by bitwise OR'ing the following operands: the content of Br_RDT(R2); and a binary value "1". Before the OR operation, none of the values of Br_RDT(R2) was known, i.e., Br_RDT(R4)[7:0]= XXXXXXX. After the OR operation, only the value of the LSB in Br_RDT(R2) is known, i.e., Br_RDT(R2)[0]=1. The source registers at this point, again, are unknown. As no source registers can be identified at this point, no OR operation can be performed upon source registers at this point. Flow then exits BB010, which is the state depicted in FIG. 10J.

FIG. 10J can also be described as depicting the state of Br_RDT 1000 upon flow entering BB09. In BB09, CPU 400 encounters the conditional branching instruction "if (R2)" without first encountering another Register-Writing instruction. At this point, it remains unknown if there are any source registers upon which the subject register R2 is dependent, hence (for the OR operation) the corresponding entries in Br_RDT 1000 cannot be determined, so Br_RDT(R2) is depicted with all X values. Subsequently, all entries in Br_RDT 1000 are left-shifted once and a value of logical zero is set in the respective LSBs.

Then Br_RDT(R2), is updated by bitwise OR'ing the following operands: the content of Br_RDT(R2); and a binary value "1". Before the OR operation, none of the values of Br_RDT(R2) was known, i.e., Br_RDT(R4)[7:0]= XXXXXXX. After the OR operation, only the value of the LSB in Br_RDT(R2) is known, i.e., Br_RDT(R2)[0]=1. The source registers at this point, again, are unknown. As no source registers can be identified at this point, no OR operation can be performed upon source registers at this point. Flow then exits BB09, which is the state depicted in FIG. 10K.

In terms of FIG. 10K, stage(i) in the trace (or the $i^{th}$ stage) is BB09. A branch prediction can be made regarding the next stage, i.e., the yet-to-be executed stage(i+1)=BB10. In BB10, the conditional branching instruction is "If (R4)." It should be understood that the state of Br_RDT(R4) in FIG. 10K characterizes how the content of R4 (which is the subject register in the conditional branching instruction of stage(i+1)=BB10) is dependent upon preceding stages (namely, i, i−1, i−2, . . . , i−5) in the trace. Hence, for the branch prediction regarding stage(i+1)=BB10 vis-a-vis FIG. 10K, the content of Br_RDT (R4) is output as the shadow vector SV, which is depicted in FIG. 11.

FIG. 11 depicts a shadow vector output from Br_RDT (again, Branch Register-Dependency Table) 1000 resulting from CPU 400 using Algorithm No. 3 to update Br_RDT 1000 as culminated in FIG. 10K under the specific (but not limiting) circumstances of the example of FIG. 2.

In FIG. 11, the shadow vector SV has the fifth bit (i.e., bit 4) as the MSNZB (again, most significant non-zero bit), hence S=5. This refers to indicates that the Register-Writing instruction in BB02 casts the longest shadow upon the subject register R4 of the conditional branching instruction in BB10, i.e., indicates how far back into the trace the dependency of R4 reaches at BB10.

Figure 15:
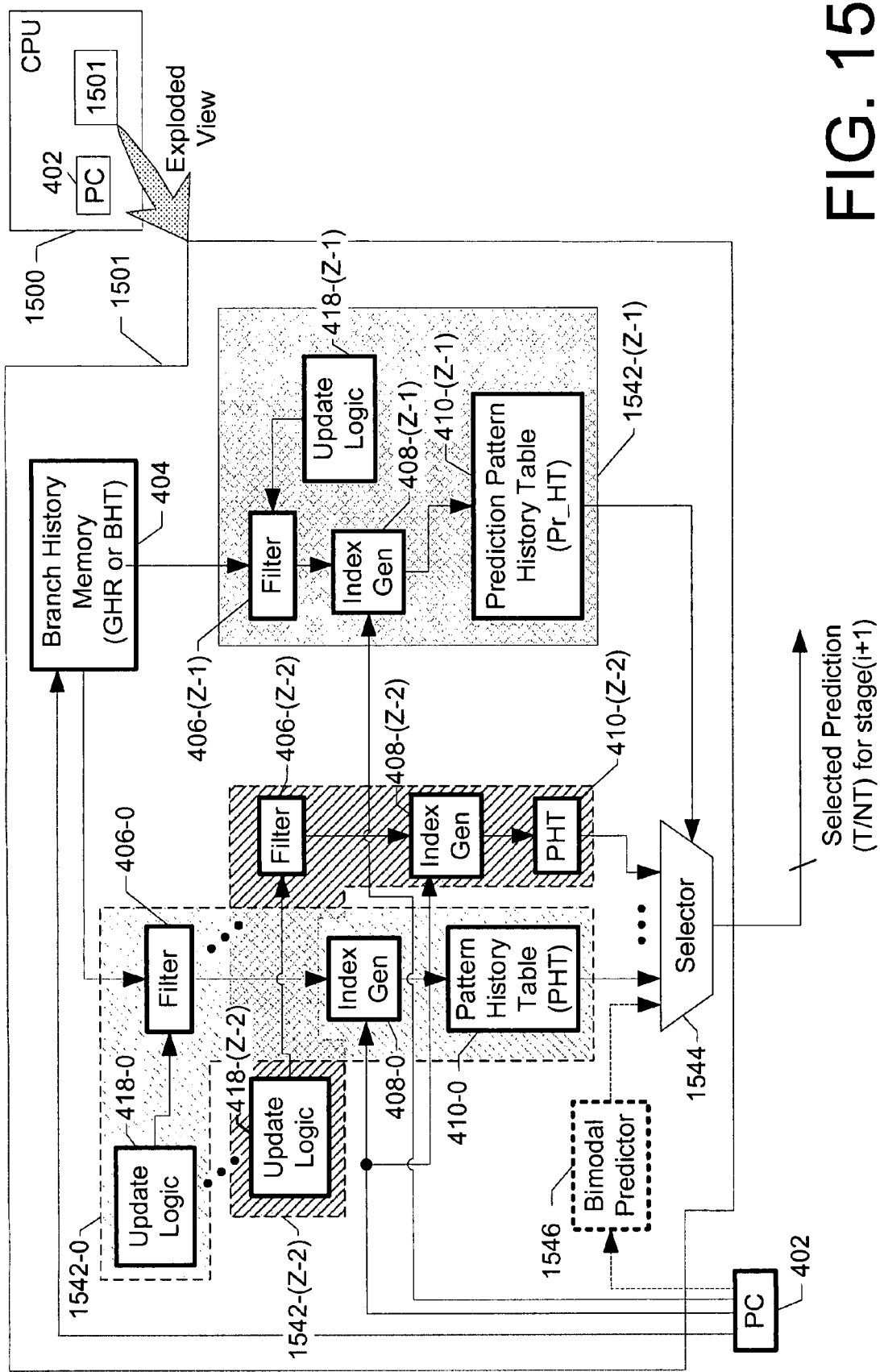
FIG. 15 is a block diagram of a branch-prediction apparatus in a CPU according to an example embodiment of the present invention.

FIG. 15 is a block diagram of a branch-prediction apparatus 1501 in a CPU 1500 according to an example embodiment of the present invention.

In FIG. 15, CPU 1500 includes branch-prediction apparatus 1501 and PC 402. Branch-prediction apparatus 1501 includes R-bit Branch History Memory (again BHM) 404 and Z−1 sets 1542-0, . . . , 1542-(Z−2) of predictive units, where Z is an integer and Z≧2. For predictive units 1542-0, . . . , 1542-(Z−2), any given one will be referred to as the $t^{th}$ predictive unit, such that the $t^{th}$ predictive unit 1542-*t* includes: a filter 406-*t*; an index generator 408-*t*; a Pattern History Table (again, PHT) 410-*t*; and update logic 418-*t*.

As noted above, PC 402 is known. Also as noted above, known types of PHT 410 include, e.g., an array of saturating 2-bit counters in which a prediction by a given counter is reflected in the MSB thereof. There can be various combinations BHM 404, PC 402 and index generator 408, e.g., corresponding to various known combinations of (1) a known Global History Register (GHR) or a known Branch History Table (BHT), (2) known index generators and (3) known PHTs, respectively. Examples of such known combinations include: Gshare; Gselect; Agree; Bi-Modal; YAGS (Yet Another Global Scheme); etc.

Typically, each predictive unit 1542-*t* will differ from the others, hence each will provide a different prediction. Accordingly, the Algorithm (e.g., Algorithm Nos. 1, 2 or 3) which update logic 418-(Z−t) implements can vary according to the particular details of pairing index generator 408-(Z−t) and PHT-(Z−t). Branch-prediction apparatus 1501 further includes a selector 1544 to select among the different predictions made by predictive units 1542-0, . . . , 1542-(Z−2), and a $Z^{th}$ predictive unit 1542-(Z−1) that is used to generate a control signal for selector 1544.

The $Z^{th}$ predictive unit 1542-(Z−1) is similar to the $t^{th}$ predictive unit 1542-*t* in that the $Z^{th}$ predictive unit 1542-(Z−1) includes: a filter 406-(Z−1); index generator 408-(Z−1); and update logic 418-(Z−1). The $Z^{th}$ predictive unit 1542-(Z−1) is similar also in terms of including a history table, though the history table is a Prediction Pattern History Table (Pr_HT) 410-(Z−1), not a PHT 410-*t*.

For each conditional branching instruction (again, CBI), Pr_HT 410-(Z−1) stores a characterization of the historical prediction-accuracy by each $t^{th}$ predictive unit 1542-*t*. Where Pr_HT 410-(Z−1) takes the form, e.g., of an array of saturating 2-bit counters, the $t^{th}$ characterization of the historical prediction-accuracy can take one of four states, such as Strongly Accurate, Accurate, Not Accurate and Strongly Not Accurate. In a manner similar to how the combination of filter 406-(Z−t), index generator 408-(Z−t) and update logic 418-(Z−t) functionally cooperate to select an entry from PHT 412(Z−t), the combination of filter 406-(Z−1), index generator 408-(Z−1) and update logic 418-(Z−1) functionally cooperate to select an entry from Pr_HT 412(Z−1). The skilled artisan will understand readily how to obtain an Algorithm (e.g., based upon a variation of Algorithm Nos. 1, 2 or 3) that is to be implemented by update logic 418-(Z−1).

Briefly, branch-prediction apparatus 1501 operates as follows to make a prediction. Predictive units 1542-0, . . . , 1542-(Z−2) make candidate predictions, respectively. Predictive unit 1542-(Z−1) makes a prediction as to which of the candidate predictions will be most accurate, and this prediction is output as a selection signal to selector 1544. Based upon the selection signal, selector 1544 outputs a selected predication.

As an alternative, branch-prediction apparatus can include a known Bimodal Predictor 1546 in addition to, or instead of, predictive units 1542-1, . . . , 1542-(Z−2). To emphasize its inclusion in the alternative, Bimodal Predictor 1546 is depicted with a dashed box. If used instead of predictive units 1542-1, . . . , 1542-(Z−2), then selector 1546 would be provided with candidate predictions from predictive unit 1542-0 and Bimodal Predictor 1546.

Branch-prediction apparatus 1501 can be described as a three-level predictor. The first level leverages the historical information in BHM 404, and further can be described as culminating in the index generated by the $t^{th}$ index generator 408-(Z–t). The second level leverages the historical information accumulated in PHT 410-t, and can be described as culminating in the candidate predictions output by the various PHT 410-(Z–t). The third level leverages the historical information accumulated in Pr_HT 410-(Z–1), and can be described as culminating in the prediction, i.e., the selection signal, output by PHT 410-(Z–1), which is used to select among the candidate predictions.

With some embodiments of the present invention having thus been described, it will be obvious that the same may be varied in many ways. Such variations are not to be regarded as a departure from the spirit and scope of the present invention, and all such modifications are intended to be included within the scope of the present invention.

The invention claimed is:

1. A method of manipulating a raw branch history using a branch prediction apparatus, the method comprising:
   providing, by the branch prediction apparatus, a raw branch history relevant to a conditional branching instruction in a program;
   providing, by the branch prediction apparatus, a Branch Register-Dependency Table (Br_RDT) from dependency information about at least one register with reference to the conditional branching instruction or a Register-Writing instruction; and
   filtering, by the branch prediction apparatus, the raw branch history to obtain a filtered branch-prediction predicate, wherein the filtering includes at least,
      outputting a shadow vector from the Br_RDT,
      altering the raw branch history into the filtered branch-prediction predicate by adjusting a length of the raw branch history based on the shadow vector.

2. The method of claim 1, wherein:
   the program is divided into a plurality of basic blocks BBs, each BB including one or more instructions, one of which is a conditional branching instruction (CBI),
      a BB containing the most-recently executed CBI being referred to as BB(i),
      a BB containing a next as-yet-unexecuted CBI being referred to as BB(i+1), and
      a jth register among a plurality thereof in a Central Processing Unit (CPU), namely REG(j), being the subject of a condition recited by the CBI of BB(i+1);
   the Branch Register-Dependency Table (Br_RDT) includes a plurality of entries corresponding to the plurality of registers in the CPU, respectively;
   a jth entry in the Br_RDT namely Br_RDT(j), being indicative of how content of the REG(j) is dependent or not upon other ones among the plurality of registers; and
   the shadow vector is a copy of the Br_RDT(j).

3. The method of claim 2, wherein:
   types of instructions that can be present in a BB further include a Register-Writing instruction.

4. The method of claim 2, wherein:
   the shadow vector is indicative of which preceding ones among the plurality of BBs had an effect or not upon the REG(j).

5. The method of claim 2, wherein:
   the shadow vector and each entry in the Br_RDT is a word that is M bits in length, M being a positive integer; and
   the altering step includes,
      identifying a most significant non-zero (MSNZ) bit, namely bit S–1; among the M bits of the shadow vector, where S is a positive integer and S≦M, and generating a bit mask that preserves bits S–1, S–2, . . . , S–(S–1), 0 of the shadow vector, and logically combining the raw branch history and the bit mask.

6. The method of claim 5, wherein the logically combining step includes:
   performing a bitwise logical AND operation upon the raw branch history and the bit mask.

7. A method of making a branch prediction, the method comprising:
   manipulating, as in claim 1, a raw branch history relevant to a given conditional branching instruction (CBI) to obtain a corresponding filtered branch-prediction predicate; and
   predicting a branching direction of the given CBI based upon the corresponding filtered branch-prediction predicate.

8. A method to populate a memory representing a Branch Register-Dependency Table (Br_RDT), the Br_RDT being adapted for storing information relevant to a multi-instruction program executable by a Central Processing Unit (CPU), the Br_RDT including entries corresponding to registers in the CPU, respectively, the method comprising:
   fetching, by the CPU, an instruction from the program;
   providing, by a branch prediction apparatus, the Branch Register-Dependency Table (Br_RDT) from dependency information about at least one of the registers with reference to the conditional branching instruction (CBI) or a Register-Writing instruction (RWI); and
   updating, by the CPU, the Br_RDT according to a first or second process depending upon whether the instruction is a conditional branching instruction (CBI) or a Register-Writing instructions (RWI), respectively,
   the first process including,
      altering, where the $j^{th}$ register is a subject register of a condition recited in the CBI, the Br_RDT(J) entry by performing thereon a first logical operation using as operands the Br_RDT(j) entry and any other entries in the Br_RDT corresponding to source registers upon which the $j^{th}$ register is dependent,
      bitwise left-shifting the entries in the Br_RDT, respectively, and
      inserting a value of logical zero into least significant bits (LSBs) of the entries in the Br_RDT, respectively, and
   the second process including,
      altering, where the $j^{th}$ register is a destination register recited by the RWI, the Br_RDT(j) entry by
      performing thereon a first logical operation using as operands the Br_RDT(j) entry and any other entries in the Br_RDT corresponding to source registers recited by the RWI if at least one source register is recited by the RWI, and
      setting the Br_RDT(j) entry equal to a binary value of zero.

9. The method of claim 8, wherein the first process further includes:
   changing, before the bitwise left-shifting step, entries in the Br_RDT corresponding to source registers upon which the $j^{th}$ register is dependent;
   the changing step, for a given entry in the Br_RDT corresponding to a given one of the source registers (REG_given), namely Br_RDT(REG_given), including:
      performing a second logical operation upon the Br_RDT (REG_given) entry using as operands the Br_RDT (REG_given) entry and a binary value of one.

10. The method of claim 8, wherein the second process further includes:

performing, after the first logical operation, a second logical operation upon the Br_RDT(j) entry using as operands the Br_RDT(j) entry and a binary value of one.

11. An apparatus for populating a memory representing a Branch Register-Dependency Table (Br_RDT), the Br_RDT being adapted for storing information relevant to a multi-instruction program executable by a Central Processing Unit (CPU), the Br_RDT including entries corresponding to registers in the CPU, respectively, the apparatus comprising:

fetching means for fetching an instruction from the program;

providing means for providing a Branch Register-Dependency Table (Br_RDT) from dependency information about at least one of the registers with reference to the conditional branching instruction (CBI) or a Register-Writing instruction (RWI); and first processing means or second processing means, the first processing means being for updating the Br_RDT if the instruction is a conditional branching instruction (CBI), the first processing means including, first altering means for altering, where the $j^{th}$ register is a subject register of a condition recited in the CBI, the Br_RDT(j) entry by performing thereon a first logical operation using as operands the Br_RDT(j) entry and any other entries in the Br_RDT corresponding to source registers upon which the $j^{th}$ register is dependent, and shifting means for bitwise left-shifting the entries in the Br_RDT and then inserting a value of logical zero into least significant bits (LSBs) of the entries in the Br_RDT respectively; and the second processing means being for updating the Br_RDT if the instruction is a Register-Writing instructions (RWI), the second means including, second altering means for altering, where the $j^{th}$ register is a destination register recited by the RWI, the Br_RDT(j) entry by performing thereon a first logical operation using as operands the Br_RDT(j) entry and any other entries in the Br_RDT corresponding to source registers recited by the RWI if at least one source register is recited by the RWI, and setting means for setting the Br_RDT(j) entry equal to a binary value of zero.

12. The apparatus of claim 11, wherein the first processing means further includes:

changing means for changing, before the bitwise left-shifting step, entries in the Br_RDT corresponding to source registers upon which the $j^{th}$ register is dependent;

the changing means, for a given entry in the Br_RDT corresponding to a given one of the source registers (REG_given), namely Br_RDT(REG_given), being further operable for, performing a second logical operation upon the Br_RDT(REG_given) entry using as operands the Br_RDT(REG_given) entry and a binary value of one.

13. The apparatus of claim 11, wherein the second processing means further includes:

changing means for performing, after the first logical operation, a second logical operation upon the Br_RDT (j) entry using as operands the Br_RDT(j) entry and a binary value of one.

14. A filter operable upon a raw branch history available from a branch history memory, the filter comprising:

a mask generator to generate a Branch Register-Dependency Table (Br_RDT) from dependency information about at least one register with reference to a conditional branching instruction or a Register-Writing instruction, to generate a shadow vector form the Br_RDT and to generate a bit mask based upon the shadow vector; and a masking unit to apply the bit mask to the raw branch history resulting in a filtered branch-prediction predicate by adjusting the length of a raw branch history.

15. The filter of claim 14, wherein the mask generator includes:

a memory representing the Branch Register-Dependency Table (Br_RDT), the memory being arranged for storing information relevant to a program executable by a Central Processing Unit (CPU), the memory including a plurality of entries corresponding to the plurality of registers in the CPU, respectively, each entry in the Br_RDT being indicative of how content of a corresponding register in the CPU is dependent or not upon other ones among the plurality of registers in the CPU; and a 1's padding unit, operable upon a copy of an entry in the Br_RDT, operable to, set a cutoff bit in the bit mask to a value of logical one, the cutoff bit corresponding to the most significant non-zero bit (MSNZB) of the entry-copy, and set all less significant bits, relative to the cutoff bit, in the bit mask to a value of logical one.

16. The filter of claim 14, wherein the masking unit includes an arrangement of logical AND gates by which the bit mask is applied to the raw branch history.

17. An apparatus for making a branch prediction, the apparatus comprising:

a branch history memory in which the raw branch history is storable;

a filter as in claim 14 to filter a raw branch history, provided by the branch history memory and relevant to a given conditional branching instruction (CBI), resulting in the filtered branch-prediction predicate; and prediction logic operable to predict a branching direction of the given CBI based upon the corresponding filtered branch-prediction predicate.

18. The apparatus of claim 17, wherein the branch history memory is one of a Branch History Register (BHR) and a Branch History Table (BHT).

19. The apparatus of claim 17, wherein the prediction logic includes:

a pattern history table (PHT) in which is storable historically-based predictions for a plurality of CBI's included in a program, respectively, the given CBI being one of the instructions in the program; and an index generator operable upon the filtered branch-prediction predicate to generate an index by which a prediction in the PHT corresponding to the given CBI is selectable.

20. A computer system comprising:

a system bus;

a memory coupled to the bus;

a Central Processing Unit (CPU); and a prediction apparatus for making a branch prediction as in claim 17, the branch prediction apparatus facilitating execution by the CPU of instructions in a program.

21. The computer system of claim 20, wherein:
the CPU is configured from hardware components; and
the prediction apparatus is included as one of the hardware components in the CPU.

22. A method of manipulating a raw branch history using a branch prediction apparatus, the method comprising:
providing, by the branch prediction apparatus, a raw branch history, the raw branch history representing a history of branching related to a plurality of conditional branching instructions (CBIs) in a program;
providing, by the branch prediction apparatus, a Branch Register-Dependency Table (Br_RDT) from dependency information about at least one register with reference to a conditional branching instruction (CBI) or a Register-Writing instruction; and
filtering, by the branch prediction apparatus, the raw branch history based upon supplemental historical information, the supplemental historical information relating to the CBIs in the program and to at least one type of instruction in the program other than a CBI, resulting in a filtered branch-prediction predicate wherein the filtering step includes at least,
outputting the supplemental historical information from the Br_RDT,
altering the raw branch history into the filtered branch-prediction predicate by adjusting the length of a raw branch history based on the supplemental historical information.

23. The method of claim 22, wherein the supplemental historical information relates to Register-Writing instructions (RWIs) that operate upon a plurality of registers in a Central Processing Unit (CPU), respectively.

24. A method of making a branch prediction, the method comprising:
manipulating, as in claim 22, the raw branch history relevant to a given conditional branching instruction (CBI) to obtain a corresponding filtered branch-prediction predicate; and
predicting a branching direction of the given CBI based upon the corresponding filtered branch-prediction predicate.

25. A method of making a branch prediction using a branch prediction apparatus, the method comprising:
providing, by the branch prediction apparatus, a first branch history reflecting branching behavior of a plurality of conditional branching instructions (CBIs) in a program, and behavior of at least one type of instruction in the program other than a CBI; and
predicting, by the branch prediction apparatus, a branching direction of a given CBI based upon the first branch history, wherein the providing step includes,
providing a Branch Register-Dependency Table (Br_RDT) from dependency information about at least one register with reference to the conditional branching instruction (CBI) or a Register-Writing instruction (RWI),
outputting supplemental historical information from the Br_RDT, and
altering the raw branch history into the filtered branch-prediction predicate by adjusting the length of a raw branch history based on the supplemental historical information.

26. The method of claim 24, wherein:
the first branch history is a filtered branch history; and
the providing step further includes,
supplying a raw second branch history that only reflects branching behavior of a plurality of conditional branching instructions (CBIs),
supplying the supplemental historical information relating to the CBIs in the program and to at least one type of instruction in the program other than a CBI, and
filtering the raw branch history based upon the supplemental historical information, resulting in the filtered first branch history.

27. The method of claim 25, wherein the supplemental historical information relates to Register-Writing instructions (RWIs) that operate upon a plurality of registers in a Central Processing Unit (CPU), respectively.

* * * * *